United States Patent
Garcia et al.

(10) Patent No.: US 8,181,407 B2
(45) Date of Patent: *May 22, 2012

(54) FLOORING SYSTEM HAVING SUB-PANELS

(75) Inventors: Eugenio Cruz Garcia, Cuenca (ES); Vicente Sabater, Valencia (ES)

(73) Assignee: Faus Group, Ganadia (Valencia) (ES)

( * ) Notice: Subject to any disclaimer, the term of this patent is extended or adjusted under 35 U.S.C. 154(b) by 634 days.

This patent is subject to a terminal disclaimer.

(21) Appl. No.: 10/689,510

(22) Filed: Oct. 21, 2003

(65) Prior Publication Data

US 2004/0200165 A1    Oct. 14, 2004

Related U.S. Application Data

(63) Continuation-in-part of application No. 10/374,751, filed on Feb. 27, 2003, which is a continuation-in-part of application No. 10/352,248, filed on Jan. 28, 2003, now Pat. No. 7,836,648, which is a continuation-in-part of application No. 10/137,319, filed on May 3, 2002, now Pat. No. 6,691,480.

(51) Int. Cl.
*E04C 1/00* (2006.01)
*B44F 9/02* (2006.01)
*B44F 7/00* (2006.01)

(52) U.S. Cl. ............... 52/311.2; 52/592.1; 52/592.2; 52/313

(58) Field of Classification Search ......... 52/579–582.1, 52/578–592.6, 311.1–311.3, 312, 316, 313–314, 52/315, 384–385, 390–392, 457–458, 403.1, 52/782.1
See application file for complete search history.

(56) References Cited

U.S. PATENT DOCUMENTS

| D16,458 S | 1/1886 | Mankey |
| 592,573 A | 10/1897 | Nicholes |
| 669,445 A | 3/1901 | Morey |
| 800,655 A | 10/1905 | Kitsee |
| 813,641 A | 2/1906 | Gilbert |

(Continued)

FOREIGN PATENT DOCUMENTS

AU                33432            8/1979

(Continued)

OTHER PUBLICATIONS

International Search Report mailed Mar. 14, 2005, corresponding to International Application No. PCT/IB2004/000884.

(Continued)

*Primary Examiner* — Jeanette E. Chapman

(57) ABSTRACT

Laminated flooring planks include decorative motifs, mechanically embossed-in-registration surface textures, recessed perimeters, and locking mechanisms. Adjacent planks substantially aligned allow embossed-in-registration patterns to be substantially continuous across adjacent flooring panels. The recessed perimeter prevents the edges of the flooring panel from prematurely wearing. Individual planks within the flooring system may comprise at least one partial sub-panel having a decorative motif and/or embossed surface texture (i.e., pattern) that is complementary with a pattern of a neighboring partial sub-panel or plank. Each plank may include edge patterns adjacent a portion of an edge of the plank and at least one bulk pattern adjacent the edge patterns. Edge patterns within a plank and of planks within a flooring system are substantially identical to each other. Bulk patterns form a substantially continuous pattern within an individual plank when adjacent a plank.

62 Claims, 16 Drawing Sheets

U.S. PATENT DOCUMENTS

| | | | |
|---|---|---|---|
| 1,202,324 A | 10/1916 | Carbureter | |
| 1,479,647 A | 1/1924 | Carroll | |
| RE16,473 E | 11/1926 | Humphreys | |
| 1,697,426 A | 1/1929 | Humphreys | |
| 1,825,877 A | 10/1931 | Loetscher | |
| 1,854,933 A * | 4/1932 | Hartman et al. | 428/48 |
| 1,869,864 A | 8/1932 | Phillips | |
| 1,996,834 A | 4/1935 | Schleicher | |
| 1,998,526 A | 4/1935 | Schubert | |
| 2,027,292 A | 1/1936 | Rockwell | |
| 2,037,465 A | 4/1936 | Gibson et al. | |
| 2,046,593 A | 7/1936 | Urbain | |
| 2,054,458 A | 9/1936 | Arge et al. | |
| 2,057,135 A | 10/1936 | Cherry | |
| 2,063,935 A | 12/1936 | Kirschbraun | |
| 2,108,226 A * | 2/1938 | Johnston | 404/42 |
| 2,137,238 A | 11/1938 | Collins | |
| 2,246,377 A | 6/1941 | Mattes | |
| 2,311,156 A | 2/1943 | Casto | |
| 2,491,498 A | 12/1949 | Gustaf | |
| 2,619,681 A | 12/1952 | Baker et al. | |
| 2,715,289 A | 8/1955 | Gale | |
| 3,002,309 A | 10/1961 | Snyder | |
| 3,025,626 A | 3/1962 | Schumacher | |
| 3,204,380 A | 9/1965 | Smith et al. | |
| 3,293,108 A | 12/1966 | Nairn et al. | |
| 3,345,234 A | 10/1967 | Jecker et al. | |
| 3,373,068 A | 3/1968 | Grosheim et al. | |
| 3,387,422 A | 6/1968 | Wanzer | |
| 3,411,977 A | 11/1968 | Slater, Jr. | |
| 3,414,194 A | 12/1968 | Seitzinger | |
| 3,421,277 A | 1/1969 | Frischmuth | |
| 3,459,400 A | 8/1969 | Rothermel | |
| 3,515,620 A | 6/1970 | McPherson | |
| 3,551,177 A | 12/1970 | Hechtman et al. | |
| 3,592,474 A | 7/1971 | O'Neil | |
| 3,627,861 A | 12/1971 | Timke | |
| 3,648,358 A | 3/1972 | Cannady et al. | |
| 3,654,044 A | 4/1972 | Hirota | |
| 3,698,978 A | 10/1972 | McQuade | |
| 3,732,137 A | 5/1973 | Scher | |
| 3,740,914 A | 6/1973 | Diez | |
| 3,740,915 A | 6/1973 | Mollman | |
| 3,802,947 A | 4/1974 | McQuade, Jr. | |
| 3,808,024 A | 4/1974 | Witman | |
| 3,810,774 A | 5/1974 | Pittman | |
| 3,814,647 A | 6/1974 | Scher et al. | |
| 3,846,219 A | 11/1974 | Kunz | |
| 3,857,915 A | 12/1974 | Crowley | |
| 3,875,716 A | 4/1975 | Eusemann | |
| 3,878,030 A | 4/1975 | Cook | |
| 3,880,687 A | 4/1975 | Elmendorf et al. | |
| 3,912,569 A | 10/1975 | Kapral | |
| 3,997,696 A | 12/1976 | Jaisle et al. | |
| 4,062,992 A | 12/1977 | Power et al. | |
| 4,092,198 A | 5/1978 | Scher et al. | |
| 4,092,199 A | 5/1978 | Ungar et al. | |
| 4,093,766 A | 6/1978 | Scher et al. | |
| 4,114,877 A | 9/1978 | Goldfarb et al. | |
| 4,118,533 A | 10/1978 | Hipchen et al. | |
| 4,125,263 A | 11/1978 | Hamilton | |
| 4,126,727 A | 11/1978 | Kaminski | |
| 4,131,705 A | 12/1978 | Kubinsky | |
| 4,143,496 A | 3/1979 | Destito | |
| 4,154,882 A | 5/1979 | Ungar et al. | |
| 4,163,818 A | 8/1979 | Wernli | |
| 4,177,305 A | 12/1979 | Feingold et al. | |
| 4,210,693 A | 7/1980 | McCann et al. | |
| 4,239,797 A | 12/1980 | Sachs | |
| 4,241,554 A * | 12/1980 | Infantino | 52/314 |
| 4,243,367 A | 1/1981 | Renoux | |
| 4,248,922 A | 2/1981 | Shortway et al. | |
| 4,284,453 A | 8/1981 | Endrizzi | |
| 4,290,248 A | 9/1981 | Kemerer et al. | |
| 4,299,069 A * | 11/1981 | Neumann | 52/309.4 |
| 4,367,110 A | 1/1983 | Yoshikawa | |
| 4,374,886 A | 2/1983 | Raghava | |
| 4,376,812 A | 3/1983 | West | |
| 4,396,448 A | 8/1983 | Ohta et al. | |
| 4,409,280 A | 10/1983 | Wiley et al. | |
| 4,420,351 A | 12/1983 | Lussi et al. | |
| D273,527 S | 4/1984 | Pota | |
| 4,490,503 A | 12/1984 | Goring | |
| 4,500,373 A | 2/1985 | Kubota | |
| 4,517,236 A | 5/1985 | Meeker et al. | |
| 4,546,025 A | 10/1985 | Vaisman | |
| 4,557,779 A | 12/1985 | Bower et al. | |
| 4,568,082 A | 2/1986 | Musolino | |
| 4,571,353 A | 2/1986 | Gable, Jr. | |
| 4,579,767 A | 4/1986 | Coggan et al. | |
| 4,581,255 A | 4/1986 | Coggan et al. | |
| 4,585,685 A | 4/1986 | Forry et al. | |
| 4,599,127 A | 7/1986 | Cannady, Jr. et al. | |
| 4,625,491 A | 12/1986 | Gibson | |
| 4,676,510 A | 6/1987 | Agam | |
| 4,689,102 A | 8/1987 | Prawdzik et al. | |
| 4,693,924 A | 9/1987 | Kuper et al. | |
| 4,702,870 A | 10/1987 | Setterholm | |
| 4,791,015 A | 12/1988 | Becker et al. | |
| 4,816,319 A | 3/1989 | Dees, Jr. et al. | |
| 4,844,849 A | 7/1989 | Miller et al. | |
| 4,860,506 A | 8/1989 | Yoshimi et al. | |
| 4,864,790 A | 9/1989 | Liaret | |
| 4,912,850 A | 4/1990 | Gray | |
| 4,940,503 A | 7/1990 | Lindgren et al. | |
| 4,950,500 A | 8/1990 | Kauffman et al. | |
| 4,953,786 A | 9/1990 | Arsenault | |
| 5,011,411 A | 4/1991 | Loewy et al. | |
| 5,034,272 A | 7/1991 | Lindgren et al. | |
| 5,053,274 A | 10/1991 | Jonas | |
| 5,112,671 A | 5/1992 | Diamond et al. | |
| 5,113,632 A * | 5/1992 | Hanson | 52/385 |
| 5,136,823 A | 8/1992 | Pellegrino | |
| 5,167,991 A | 12/1992 | Lowe | |
| 5,226,273 A | 7/1993 | Burke | |
| 5,234,340 A | 8/1993 | Hambright | |
| 5,283,102 A | 2/1994 | Sweet et al. | |
| 5,295,341 A | 3/1994 | Kajiwara | |
| 5,304,272 A | 4/1994 | Rohrbacker et al. | |
| 5,314,554 A | 5/1994 | Owens | |
| 5,335,473 A | 8/1994 | Chase | |
| 5,391,340 A | 2/1995 | Mirous et al. | |
| 5,413,834 A | 5/1995 | Hunter et al. | |
| 5,425,986 A | 6/1995 | Guyette | |
| 5,437,934 A * | 8/1995 | Witt et al. | 428/537.1 |
| 5,468,323 A | 11/1995 | McNeil | |
| 5,487,217 A | 1/1996 | Richardson et al. | |
| 5,496,129 A | 3/1996 | Dube | |
| 5,525,394 A | 6/1996 | Clarke et al. | |
| D373,203 S | 8/1996 | Kornfalt et al. | |
| 5,554,429 A | 9/1996 | Iwata et al. | |
| 5,558,933 A | 9/1996 | Anthony | |
| 5,570,554 A | 11/1996 | Searer | |
| 5,587,218 A | 12/1996 | Betz | |
| 5,637,236 A | 6/1997 | Lowe | |
| 5,681,428 A | 10/1997 | Nakajima et al. | |
| 5,692,749 A | 12/1997 | Vogeler | |
| 5,713,173 A | 2/1998 | Von Langsdorff et al. | |
| 5,723,221 A | 3/1998 | Brooker et al. | |
| 5,736,227 A | 4/1998 | Sweet et al. | |
| 5,744,220 A | 4/1998 | Ringö | |
| 5,755,068 A * | 5/1998 | Ormiston | 52/314 |
| 5,766,752 A | 6/1998 | Cox et al. | |
| 5,774,236 A | 6/1998 | Blazey | |
| 5,815,995 A * | 10/1998 | Adam | 52/177 |
| 5,830,529 A | 11/1998 | Ross | |
| 5,853,637 A | 12/1998 | Bryant | |
| 5,858,160 A | 1/1999 | Piacente et al. | |
| 5,862,643 A | 1/1999 | Schilham | |
| 5,884,445 A | 3/1999 | Woolford | |
| 5,894,700 A | 4/1999 | Sweet | |
| 5,961,903 A | 10/1999 | Eby et al. | |
| 5,985,397 A | 11/1999 | Witt et al. | |
| 5,992,106 A | 11/1999 | Carling et al. | |
| 6,032,425 A | 3/2000 | Gugliotti et al. | |
| 6,099,782 A | 8/2000 | Holmes | |
| 6,101,778 A | 8/2000 | Martensson | |

| | | | |
|---|---|---|---|
| 6,103,352 A | 8/2000 | Takahashi |
| 6,114,008 A | 9/2000 | Eby et al. |
| 6,131,355 A | 10/2000 | Groh et al. |
| 6,134,854 A | 10/2000 | Stanchfield |
| 6,146,252 A | 11/2000 | Mårtensson |
| 6,156,402 A | 12/2000 | Smith |
| 6,182,410 B1 | 2/2001 | Pervan |
| 6,182,413 B1 | 2/2001 | Magnusson |
| 6,189,283 B1 | 2/2001 | Bentley et al. |
| 6,203,879 B1 | 3/2001 | Desai |
| 6,224,698 B1 | 5/2001 | Endo |
| 6,247,285 B1 | 6/2001 | Moebus |
| 6,300,279 B1 | 10/2001 | Macedo |
| 6,375,777 B1 | 4/2002 | Sjölin et al. |
| 6,397,544 B1 | 6/2002 | Desai |
| 6,401,415 B1 | 6/2002 | Garcia |
| 6,418,683 B1 | 7/2002 | Martensson et al. |
| 6,421,970 B1 | 7/2002 | Martensson et al. |
| 6,449,913 B1 | 9/2002 | Shelton |
| 6,460,306 B1 | 10/2002 | Nelson |
| 6,465,046 B1 | 10/2002 | Hansson et al. |
| 6,494,982 B1 | 12/2002 | Mueller et al. |
| 6,517,935 B1 | 2/2003 | Kornfaelt et al. |
| 6,519,912 B1 | 2/2003 | Eckmann et al. |
| 6,536,178 B1 | 3/2003 | Paalsson et al. |
| 6,551,678 B1 | 4/2003 | O'Brien et al. |
| 6,558,163 B2 | 5/2003 | Riitano |
| 6,558,754 B1 | 5/2003 | Velin et al. |
| 6,565,919 B1 | 5/2003 | Hansson et al. |
| 6,588,163 B2 | 7/2003 | Wang et al. |
| 6,609,348 B2 | 8/2003 | Desai |
| 6,617,009 B1 | 9/2003 | Chen et al. |
| 6,627,029 B1 | 9/2003 | Mueller et al. |
| 6,638,387 B2 | 10/2003 | Cruz |
| 6,688,061 B2 | 2/2004 | Garcia |
| 6,691,480 B2 * | 2/2004 | Garcia ............................ 52/313 |
| 6,709,764 B1 | 3/2004 | Perrin |
| 6,786,019 B2 * | 9/2004 | Thiers ........................ 52/589.1 |
| 6,790,042 B2 | 9/2004 | Worth |
| 6,803,110 B2 | 10/2004 | Drees et al. |
| 6,805,951 B2 | 10/2004 | Kornfalt et al. |
| 6,860,074 B2 | 3/2005 | Stanchfield |
| D504,181 S | 4/2005 | Stanchfield |
| 6,874,292 B2 | 4/2005 | Moriau et al. |
| 6,880,307 B2 | 4/2005 | Schwitte et al. |
| 6,884,493 B2 | 4/2005 | Magee et al. |
| D504,730 S | 5/2005 | Kornfalt et al. |
| D504,731 S | 5/2005 | Stanchfield |
| 6,898,911 B2 | 5/2005 | Kornfalt et al. |
| 6,918,220 B2 | 7/2005 | Pervan |
| 6,925,764 B2 | 8/2005 | Hrovath et al. |
| 6,966,161 B2 | 11/2005 | Palsson et al. |
| 7,055,290 B2 | 6/2006 | Thiers et al. |
| 7,070,846 B2 | 7/2006 | Beistline et al. |
| 7,083,841 B2 | 8/2006 | Oakey et al. |
| 7,243,469 B2 | 7/2007 | Miller et al. |
| 7,249,445 B2 * | 7/2007 | Thiers ........................ 52/592.1 |
| 7,716,896 B2 | 5/2010 | Pervan |
| 2001/0034992 A1 | 11/2001 | Pletzer et al. |
| 2002/0001407 A1 | 1/2002 | Uchida |
| 2002/0014047 A1 | 2/2002 | Thiers et al. |
| 2002/0046526 A1 | 4/2002 | Knauseder |
| 2002/0046527 A1 | 4/2002 | Nelson |
| 2002/0046528 A1 | 4/2002 | Pervan et al. |
| 2002/0046542 A1 | 4/2002 | Tychsen |
| 2002/0056245 A1 | 5/2002 | Thiers |
| 2002/0059765 A1 | 5/2002 | Nogueira et al. |
| 2002/0100231 A1 | 8/2002 | Miller et al. |
| 2002/0100242 A1 | 8/2002 | Olofsson |
| 2002/0110669 A1 | 8/2002 | Garcia |
| 2002/0160680 A1 | 10/2002 | Laurence et al. |
| 2002/0189183 A1 | 12/2002 | Ricciardelli et al. |
| 2003/0108717 A1 | 6/2003 | Sjoberg et al. |
| 2003/0159389 A1 | 8/2003 | Kornfalt et al. |
| 2003/0167717 A1 | 9/2003 | Garcia |
| 2003/0205012 A1 | 11/2003 | Garcia |
| 2003/0205316 A1 | 11/2003 | Kai |
| 2003/0208980 A1 | 11/2003 | Miller et al. |
| 2004/0074191 A1 | 4/2004 | Garcia |
| 2005/0079323 A1 | 4/2005 | Miller et al. |
| 2006/0032168 A1 | 2/2006 | Thiers et al. |
| 2006/0191222 A1 | 8/2006 | Sabater et al. |
| 2006/0201093 A1 | 9/2006 | Stanchfield |
| 2006/0260241 A1 | 11/2006 | Stanchfield |
| 2007/0298209 A1 | 12/2007 | Kohlman et al. |
| 2008/0193698 A1 | 8/2008 | Oakey et al. |

FOREIGN PATENT DOCUMENTS

| | | |
|---|---|---|
| AU | 519917 | 1/1982 |
| CH | 645 301 | 9/1994 |
| CN | 2122896 | 11/1992 |
| CN | 1068775 | 2/1993 |
| CN | 2144677 | 10/1993 |
| CN | 1086282 | 5/1994 |
| CN | 1093657 | 10/1994 |
| CN | 2178751 | 10/1994 |
| CN | 1111316 | 11/1995 |
| CN | 1124814 | 6/1996 |
| CN | 1139143 | 1/1997 |
| CN | 1140646 | 1/1997 |
| CN | 1161013 | 10/1997 |
| CN | 2276875 | 3/1998 |
| CN | 2312287 | 3/1999 |
| CN | 2323056 | 6/1999 |
| CN | 1223931 | 7/1999 |
| CN | 1240167 | 1/2000 |
| CN | 1256200 | 6/2000 |
| CN | 1278484 | 1/2001 |
| CN | 1282654 | 2/2001 |
| CN | 1285449 | 2/2001 |
| CN | 2428285 | 5/2001 |
| CN | 1376230 | 10/2002 |
| CN | 1426880 | 7/2003 |
| CN | 1721638 | 1/2006 |
| CN | 1737295 | 2/2006 |
| CN | 2834942 | 11/2006 |
| DE | 21 11 772 | 9/1971 |
| DE | 02 239 352 | 2/1974 |
| DE | 26 57 809 | 6/1978 |
| DE | 2752864 | 5/1979 |
| DE | 30 07 979 A1 | 10/1981 |
| DE | 3219508 | 12/1983 |
| DE | 33 28 528 | 6/1985 |
| DE | 36 34 764 | 4/1988 |
| DE | 196 10 669 | 3/1997 |
| DE | 197 22 339 A1 | 12/1998 |
| DE | 199 01 377 A | 7/2000 |
| DE | 200 08 837 U1 | 8/2000 |
| DE | 201 00 320 | 4/2001 |
| DE | 203 00 412 | 3/2003 |
| DE | 102 04 154 | 8/2003 |
| DE | 203 11 569 | 10/2003 |
| DE | 20313350 | 12/2003 |
| EP | 0461758 | 12/1991 |
| EP | 0 592 573 B1 | 9/1996 |
| EP | 0 788 576 | 9/2000 |
| EP | 0 813 641 B1 | 7/2001 |
| EP | 0 888 215 B1 | 6/2002 |
| EP | 1 225 033 A1 | 7/2002 |
| EP | 1 229 183 | 8/2002 |
| EP | 0 883 487 B1 | 10/2002 |
| EP | 1 153 736 B1 | 11/2004 |
| ES | 163421 U | 5/1971 |
| ES | 460194 A | 5/1978 |
| ES | 283331 U | 5/1985 |
| ES | 1019585 U | 4/1992 |
| FR | 571542 | 5/1924 |
| FR | 976356 | 3/1951 |
| FR | 1 293 043 | 5/1962 |
| FR | 1 354 755 | 6/1964 |
| FR | 1 489 710 | 7/1967 |
| FR | 2 409 867 | 6/1979 |
| FR | 2 530 274 | 1/1984 |
| FR | 2 536 337 | 5/1984 |
| GB | 1 202 324 | 8/1970 |
| GB | 1 215 971 | 12/1970 |
| GB | 1 262 850 | 2/1972 |
| GB | 2 054 458 | 2/1981 |

| | | |
|---|---|---|
| GB | 1 590 540 | 6/1981 |
| GB | 2 088 280 | 6/1982 |
| GB | 2 145 421 | 3/1985 |
| GB | 2 191 953 | 12/1987 |
| GB | 2 345 269 | 7/2000 |
| GB | 2 345 369 A | 7/2000 |
| JP | 52-042572 | 4/1977 |
| JP | 54-65528 | 5/1979 |
| JP | 55-100154 | 7/1980 |
| JP | 63-040055 | 2/1988 |
| JP | 01-010847 | 1/1989 |
| JP | 1-087315 | 3/1989 |
| JP | 2-143846 | 6/1990 |
| JP | 3-028257 | 2/1991 |
| JP | 4-24935 | 2/1992 |
| JP | 6-010482 | 1/1994 |
| JP | 6-508897 | 10/1994 |
| JP | 7-88992 | 4/1995 |
| JP | 7-266305 | 10/1995 |
| JP | 9-011259 | 1/1997 |
| JP | H-10-183964 | 7/1998 |
| JP | 2000-265652 | 9/2000 |
| JP | 2004-84285 | 3/2004 |
| JP | 2004-225456 | 8/2004 |
| JP | 2005-523394 | 8/2005 |
| KR | 10-0430315 | 5/1999 |
| RU | 2077640 | 4/1997 |
| RU | 2123094 | 12/1998 |
| RU | 21785 | 10/2001 |
| SU | 896216 | 1/1982 |
| SU | 1271955 | 11/1986 |
| SU | 1716040 | 2/1992 |
| SU | 1716041 | 2/1992 |
| WO | WO 79/00629 | 9/1979 |
| WO | WO 91/06427 | 5/1991 |
| WO | WO 94/26999 | 11/1994 |
| WO | WO 97/19232 | 5/1997 |
| WO | WO 97/31176 | 8/1997 |
| WO | 97/31776 A1 | 9/1997 |
| WO | WO 97/31775 | 9/1997 |
| WO | WO 97/47834 | 12/1997 |
| WO | WO 01/33011 | 5/2001 |
| WO | WO 01/48333 A1 | 7/2001 |
| WO | WO 01/96689 A1 | 12/2001 |
| WO | WO 02/055809 | 7/2002 |
| WO | WO 02/058924 | 8/2002 |
| WO | WO 03/006232 | 1/2003 |
| WO | WO 03/006323 A | 1/2003 |
| WO | WO 03/047858 | 6/2003 |
| WO | WO 03/078761 A1 | 9/2003 |

OTHER PUBLICATIONS

"Surface Decoration of Artificial Board".
"The Practical Manual for Intensified Wood Floor Board".
"Resin Impregnated Paper for Overlaying".
Letter from Paul Oakley to Tarkett Distributor Sales Representatives; "Ceramique Tile Introduction", Jul. 29, 1999, three pages.
Letter from Paul Oakley to Tarkett Distributor Sales Representatives; "Ceramique Tile Introduction", Jul. 29, 1999, one page.

* cited by examiner

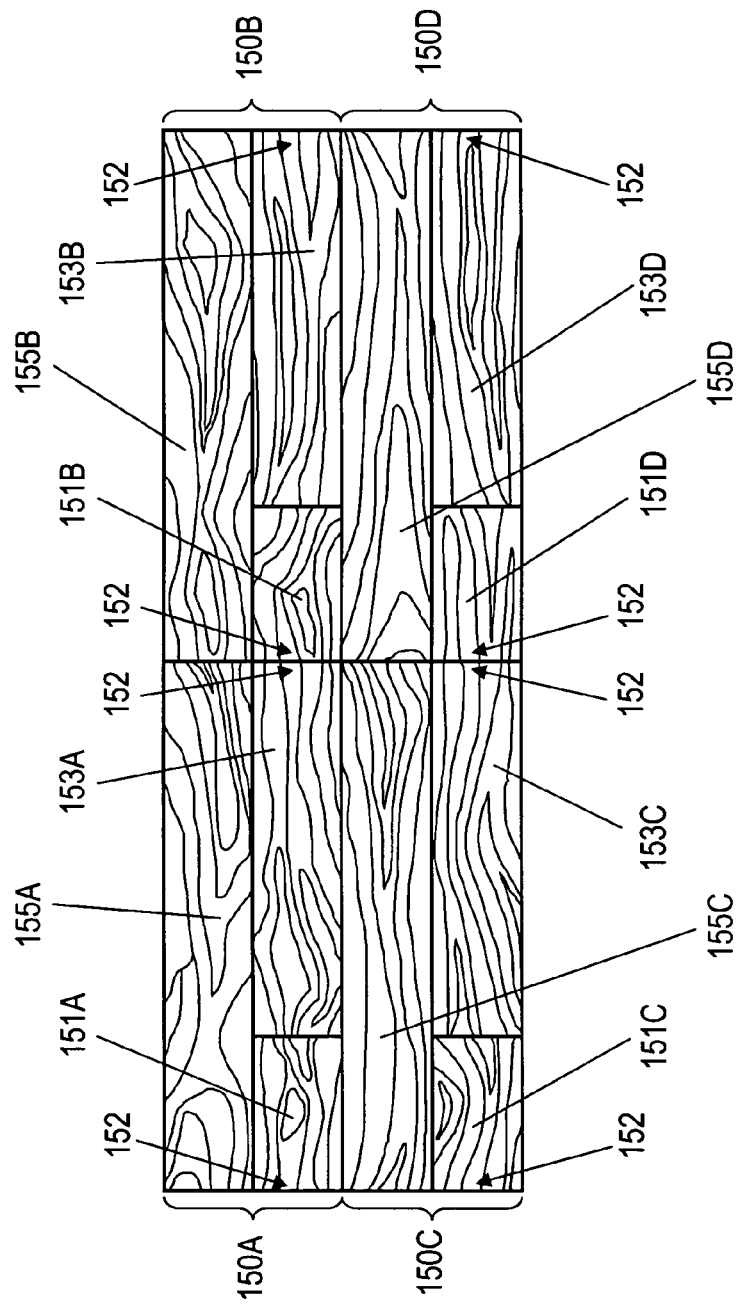

FLOORING SYSTEM HAVING SUB-PANELS

This application is a Continuation-in-Part of co-pending application Ser. No. 10/374,751, filed on Feb. 27, 2003, entitled "FLOORING SYSTEM HAVING COMPLEMENTARY SUB-PANELS", which is a Continuation-in-Part of application Ser. No. 10/352,248, filed on Jan. 28, 2003 now U.S. Pat. No. 7,836,648, entitled "FLOORING SYSTEM HAVING COMPLEMENTARY SUB-PANELS", which is a Continuation-in-Part of application Ser. No. 10/137,319, filed on May 3, 2002 now U.S. Pat. No. 6,691,480, entitled "EMBOSSED-IN-REGISTER PANEL SYSTEM" and incorporates by reference co-pending application Ser. No. 09/903,807, filed on Jul. 31, 2001, entitled "EMBOSSED-IN-REGISTER MANUFACTURING PROCESS" and U.S. Pat. No. 6,401,415, filed on Dec. 13, 1999, entitled "DIRECT LAMINATED FLOOR", for all purposes as if fully set forth herein.

BACKGROUND OF THE INVENTION

1. Field of the Invention

The present invention relates to laminated materials. More particularly, the present invention relates to a flooring system of interlocked laminated materials having decorative motifs and surface textures that are mechanically embossed in registration with their decorative motifs.

2. Discussion of the Related Art

Because of their look and feel, traditional building and finishing flooring materials such as fine woods, slate, granite, stones, brick, and concrete are generally preferred by consumers. However, such traditional building and finishing flooring materials tend to be expensive to produce and install. For example, while a solid wood floor has a highly valued luxurious appearance, the materials and labor required to install such floors can be prohibitively expensive.

Many alternatives to traditional building and finishing flooring materials are available, including laminates such as high-pressure laminates (HPL), direct-pressure laminates (DPL), and continuous-pressure laminates (CPL). However, such alternatives typically do not possess the realistic look and texture of the traditional building and finishing flooring materials. For example, most alternatives having an outer surface with a wood motif look fake and can readily be identified as something other than authentic wood. Furthermore, while high quality HPL, DPL, or CPL boards may visually look like wood, their textures readily reveal that they are not.

One problem with most alternatives to traditional building and finishing flooring materials is that their surface textures do not match their decorative motifs. For example, visual depictions of wood knots in alternative flooring materials are not matched with surface textures characteristic of the wood knots. Accordingly, the attractiveness of these alternative materials is significantly reduced.

One approach used to match the surface texture of alternative flooring materials to their decorative motifs includes a technique known as chemical embossing. In chemical embossing, the surface texture of the alternative material is developed by chemically reacting an ink that forms the decorative motif with an agent added to a sub-surface layer. While somewhat successful, the resulting surface texture tends to lack the textual sharpness and three-dimensional characteristics of traditional materials.

As an alternative to the traditional building and finishing flooring materials laminated materials may be mechanically embossed to produce a surface texture. See, for example U.S. patent application Ser. No. 09/903,807 and U.S. Pat. No. 6,401,415, which are hereby incorporated by reference. Such methods produce embossed-in-registration laminated materials having decorative motifs and matching high-quality three-dimensional textures. Embossed-in-registration laminated materials require accurate registration of mechanical embossment and the decorative motif. An advantage of embossed-in-registration laminated materials is that they can realistically reproduce the look and feel of traditional products.

No matter what type of flooring system is used, the flooring system must be easily moved to a work site while being easy and quick to install. To this end, assembly and locking mechanisms may be incorporated within flooring systems to facilitate on-site installation. One type of assembly and locking mechanism is the tongue and groove system used for connecting panels. It is understood that such tongue and groove systems are disclosed in Cherry, U.S. Pat. No. 2,057,135, and in Urbain, U.S. Pat. No. 2,046,593. For example, FIG. 1 can be interpreted to illustrate a tongue and groove system 11 that uses clips 12 to secure panels together.

Another type of assembly and locking mechanism is understood to be disclosed in Chevaux, U.S. Pat. No. 3,946,529 where a flooring system 13 appears to be connected using a tongue and groove system arranged underneath the flooring, reference FIG. 2.

Still another assembly and locking mechanism is taught in Kajiwara, U.S. Pat. No. 5,295,341. There, it is understood that laminated boards are provided with a snap-together system such as a groove-tongue joint. As a result the laminated boards can be assembled without glue. Referring to FIG. 3, the laminated boards are provided with a locking means in the form of a groove connector 16, and a tongue connector 18. The groove connector 16 has forwardly protruding grooves 20, while the tongue 18 is provided with a pair of forwardly diverging sidewalls 22 and 24 that are separated by an elongated groove 26. The sidewalls include rear locking surfaces 28 and 36. The sidewalls can be compressed together to enable locking.

Another type of assembly and locking mechanism is the snap-together joint is suggested in Märtensson, U.S. Pat. No. 6,101,778. As shown in FIG. 4, it is understood that laminated boards are provided with a locking means comprised of a groove 6 and a tongue 7 that form a tongue-groove assembly. The groove 6 and tongue 7 may be made of water tight material and snapped together with a portion 9 fitting in a slot 4.

While the aforementioned assembly and locking mechanisms have proven useful, they have not been used with embossed-in-registration laminate systems in which embossed-in-registration decorative motifs or graphics align across joints between the individual embossed-in-registration laminates. This significantly detracts from the visual and textural impression of systems comprised of embossed-in-registration laminate boards. Therefore, a new embossed-in-registration laminate system in which the visual and textural patterns cross joints while retaining the embossed-in-registration aspects would be beneficial. Even more beneficial would be an embossed-in-registration laminate system comprised of interlocking embossed-in-registration laminate boards in which the visual and textural patterns cross joints while retaining embossed-in-registration aspects.

Further, the aforementioned flooring systems have a relatively low ability to resist wear. While not wishing to be bound by any particular theory, it is hypothesized that premature aging (wear) begins at or near the perimeter edges and/or along tongue and groove lines. The aforementioned flooring systems have a substantially even (level) surface texture such that the center and perimeter of each panel contact users (e.g., pedestrians) an equal amount. The perimeter of each panel, however, is substantially weaker than the center of the panel and therefore deteriorates first.

Accordingly, there is a need for a workable method of fabricating alternative building or finishing materials where the alternatives have the realistic look and feel of traditional products and have an increased capacity to resist premature wear.

SUMMARY OF THE INVENTION

Accordingly, the present invention is directed to embossed-in-registration flooring system that substantially obviates one or more of the problems due to limitations and disadvantages of the related art.

An advantage of the present invention provides an embossed-in-registration flooring system including individual adjacent flooring planks having embossed-in-registration decorative motifs where at least one of a surface texture and decorative motif is substantially aligned between adjacent flooring plank.

Another advantage of the present invention provides an embossed-in-registration flooring system including interlocked flooring planks having embossed-in-registration decorative motifs where at least one of a surface texture and decorative motif is substantially aligned between adjacent flooring planks such that substantially continuous embossed-in-registration patterns are formed across the interlocked flooring planks.

Another advantage of the present invention provides an embossed-in-registration flooring system may, for example, include flooring planks wherein a surface of a perimeter of each individual flooring plank may be recessed such that an upper surface of the perimeter of the flooring planks is below a portion of an upper surface of the flooring planks surrounded by the perimeter.

Another advantage of the present invention provides a plank comprising a plurality of sides defining a perimeter; a plurality of edge patterns arranged proximate at least one first portion of the perimeter, wherein at least two of the plurality of edge patterns are substantially identical; and at least one bulk pattern arranged adjacent the plurality of edge patterns and proximate at least one second portion of the perimeter, wherein at least one bulk pattern and an edge pattern adjacent the at least one bulk pattern forms a substantially continuous pattern.

Another advantage of the present invention provides a flooring system, comprising at least two planks adjacent each other along a predetermined direction, wherein each plank comprises: a plurality of sides defining a perimeter; a plurality of edge patterns arranged proximate at least one first portion of the perimeter, wherein at least two of the plurality of edge patterns are substantially identical; and at least one bulk pattern arranged adjacent the plurality of edge patterns and proximate at least one second portion of the perimeter, wherein at least one bulk pattern and an edge pattern adjacent the at one least bulk pattern forms substantially continuous pattern; herein edge patterns of the at least two planks form a substantially continuous pattern.

A further advantage of the present invention provides a floor panel, comprising a plurality of sides defining a perimeter; a surface having thereon a decorative motif, said decorative motif comprising at least two edge patterns adjacent each of the sides of the panel and at least one bulk pattern in the interior of the panel and adjacent the edge pattern on each side, wherein at least one edge pattern along a side is substantially identical to the edge pattern in a corresponding position along an opposite side; and wherein at least one portion of the decorative motif along a side is substantially different from the corresponding portion of the decorative motif along an opposite side.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 14A-14C illustrate an exemplary plank of a flooring system in still another aspect of the present invention+ and FIGS. 15A-15E illustrate exemplary methods of forming patterns on a flooring plank in accordance with the principles of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
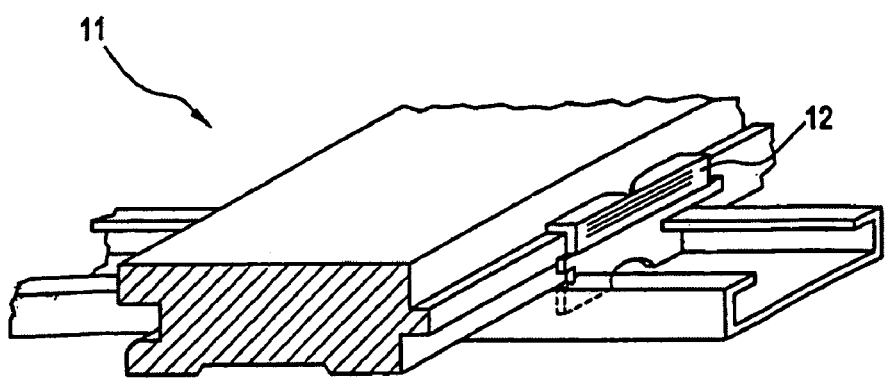
FIG. 1 illustrates a related art assembly and locking mechanism.
Figure 2:
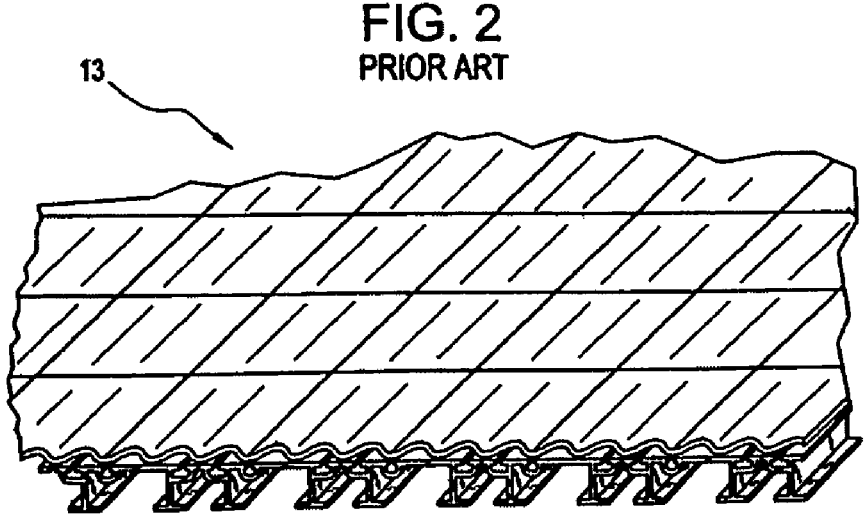
FIG. 2 illustrates another related art assembly and locking mechanism.
Figure 3:
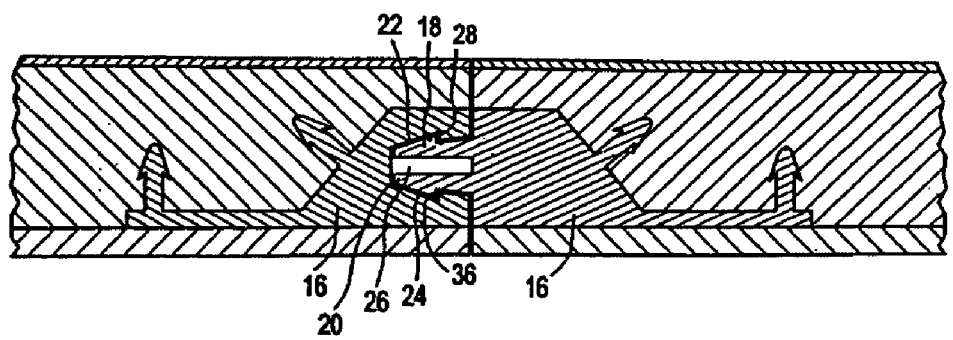
FIG. 3 illustrates yet another related art assembly and locking mechanism.
Figure 4:
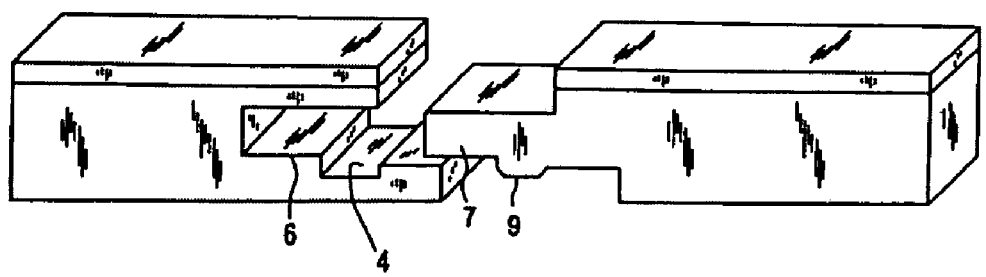
FIG. 4 illustrates still another related art assembly and locking mechanism.
Figure 5:
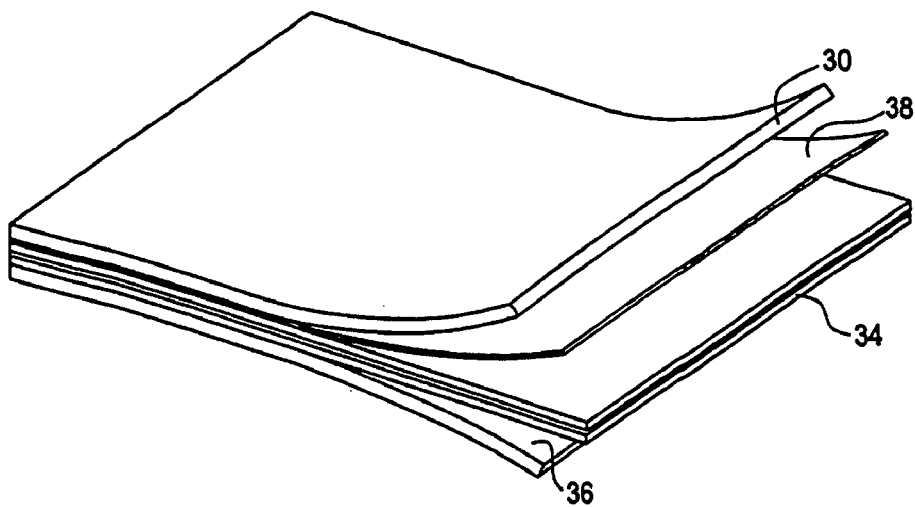
FIG. 5 illustrates a perspective view of components in an embossed-in-registration flooring plank according to the principles of the present invention.

FIG. 5 generally illustrates components of a flooring plank according to the principles of the present invention.

Referring to FIG. 5, an embossed-in-registration flooring system may, for example, include at least one flooring plank. In one aspect of the present invention each flooring plank may include a board substrate 40 made out of a substrate material (e.g., a medium or high density fiberboard, chipboard, etc.), at least one base sheet 48 (e.g., a kraft paper sheet) impregnated with predetermined resins and arranged over and/or under the board substrate 40, a decorative paper sheet 44 about 0.15 mm thick and impregnated with a polymerizable resin (e.g., phenols such as melamine) arranged over the board substrate, and at least one protective overlay sheet 46 arranged over the decorative paper sheet 44. In one aspect of the present invention, each protective overlay sheet 46 may be formed from a highly resistant paper impregnated with a melamine solution containing corundum ($Al_2O_3$), silica, etc. In another aspect of the present invention, different papers may be arranged between the decorative paper sheet 44 and the board substrate 40. In one aspect of the present invention, the at least one protective overlay sheet 46 and the base sheet 48 may be impregnated with a resin. In another aspect of the present invention the resin impregnating the at least one protective overlay sheet 46 and the base sheet 48 may be different from the melamine resin used to impregnate the decorative paper sheet 44.

In one aspect of the present invention, flooring planks within a flooring system may be fabricated from substantially the same paper, resin, etc. For example, flooring planks within a flooring system may be fabricated using paper made from substantially the same paper fibers (having, for example, substantially the same ash content, color, and orientation) on the same on the same paper making machine. Further, flooring planks within a flooring system may be fabricated using paper originating from a single, contiguous section on the manufacturing spool. All of the aforementioned paper use restrictions that may be employed in fabricating flooring planks of a flooring system ensure that impregnated papers will always have substantially the same final dimensions after they are pressed and cured. In one aspect of the present invention, the warehousing of paper used to fabricated flooring planks within a flooring system may be controlled such that the time, temperature, and humidity in which the paper is stored is maintained to facilitate consistent flooring plank dimensions. In another aspect of the present invention, flooring planks within a flooring system may be fabricated using cellulose paste made from the same manufacturer. In yet another aspect of the present invention, flooring planks within a flooring system may be fabricated using resins made from the same manufacturer. In still another aspect of the present invention, the resins may contain powder originating from substantially the same source, have substantially the same chemical and physical qualities, and be mixed in the same reactor. Further, flooring planks within a flooring system may be fabricated using resins have a substantially constant solids content. All of the aforementioned resin use restrictions that may be employed in fabricating the flooring planks ensure that impregnated papers will always have substantially the same final dimensions after they are pressed and cured. In still another aspect of the present invention, each of the flooring planks within a flooring system may be fabricated using substantially the same impregnation process. For example, when dipping the various sheets of paper into melamine resin, the paper should experience a constant, uniform melamine load. Further, a band tension and oscillation of the impregnation machine should be precisely controlled as they influence the degree to which the various paper sheets are impregnated with the resin.

According to the principles of the present invention, the aforementioned sheets and substrates may be fabricated into an embossed-in-registration flooring system including a plurality of interlocking flooring planks. To produce such a flooring system, a press machine, such as a press machine shown in FIG. 6, may be used to mechanically emboss each flooring plank in registration with a decorative motif arranged on the decorative paper sheet 44.

Figure 6:
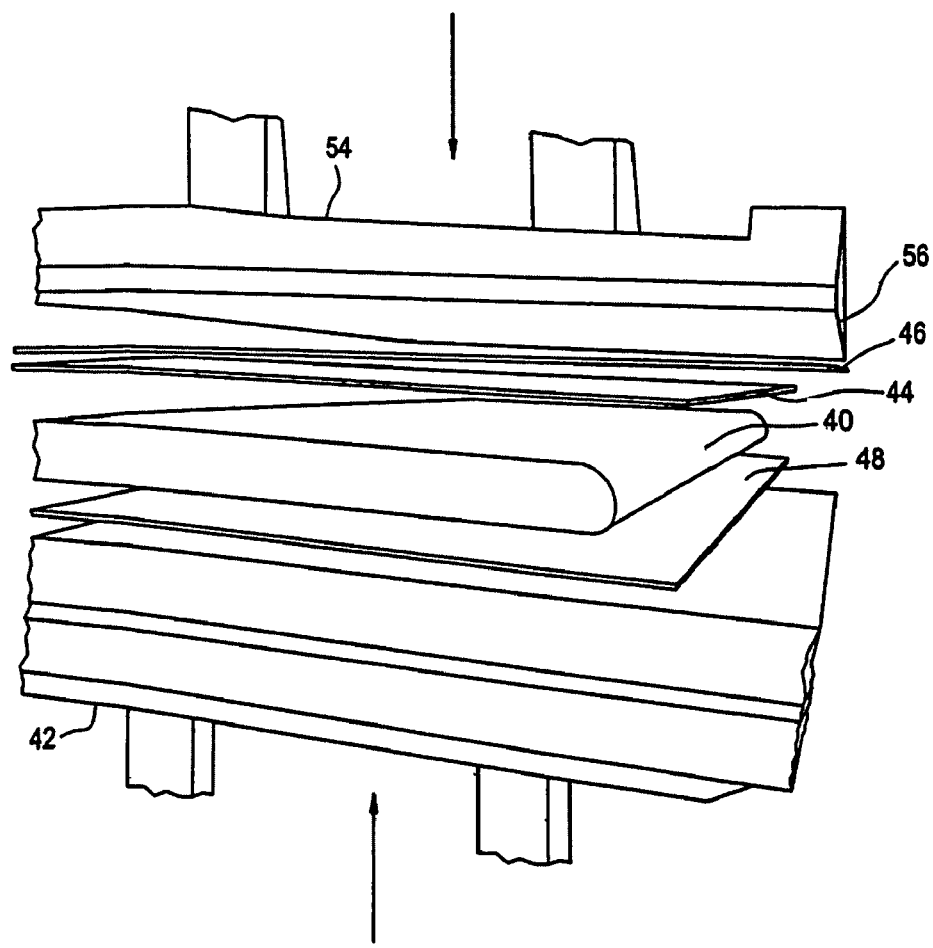
FIG. 6 illustrates a press machine capable of fabricating embossed-in-registration flooring planks in accordance with the principles of the present invention.

Referring to FIG. 6, the press machine may, for example, include a base 42, a top press 54, and an upper press plate 56. In one aspect of the present invention, the upper press plate may include an embossing pattern (e.g., a three-dimensionally textured surface). Accordingly, the embossing pattern may, for example, include elevated ridges, dots, depressions, etc., of any design capable of being aligned with a decorative motif formed on the decorative paper sheet 44.

According to the principles of the present invention, the impregnated decorative paper sheet 44 arranged on the board substrate 40 must be accurately positioned relative to the embossing pattern of the upper press plate to enable an embossed-in-registration flooring plank. In one aspect of the present invention, alignment between the embossing pattern of the press plate and the decorative motif must be ensured when the press is in a locked position and the board is under pressure. The degree of control required may vary depending on the type of decorative motif used. For example, alignment of a wood grain embossed-in-registration motif across adjacent embossed-in-registration flooring planks requires a higher degree of alignment than alignment of a wood grain embossed-in-registration motif that is not aligned with adjacent flooring planks.

Alignment between the decorative motif on the decorative paper sheet 44 and the embossing pattern on the upper press plate 56 may be achieved by removing about 2 to 3 millimeters of material around the perimeter of the board substrate 40 in a milling process thereby yielding several reference planes (e.g., board edges) and a board substrate having tightly controlled dimensions. Next, an impregnated decorative paper sheet 44 having exterior dimensions about 8 or 10 mm smaller than the board substrate 40 is arranged on the board substrate 40. In one aspect of the present invention, the impregnated decorative paper sheet 44 may be arranged on the board substrate 40 using the board edges as alignment means. In one aspect of the present invention, alignment marks may be arranged on the board substrate 40 and be alignable with alignment marks provided on the decorative paper sheet 44.

In one aspect of the present invention, the decorative paper sheet 44 may be attached to the board substrate 40 via static electricity. After they are attached, the decorative paper sheet 44 and the board substrate 40 are arranged on a carriage feeding into the press machine. The static electricity may substantially prevent the decorative paper sheet 44 from being accidentally displaced as the board substrate 40 is moved with the carriage. In one aspect of the present invention, the carriage may be stopped just before it enters into the press machine such that the decorative paper sheet 44 may be precisely arranged over the board substrate 40 using, for example, tweezers (not shown). In another aspect of the present invention, the tweezers may be used to precisely arrange the decorative paper sheet 44 over the board substrate 40 arranged on the lower press plate. In one aspect of the present invention, the decorative paper sheet 44, the at least one protective overlay sheet 46, and the optional base sheet 48 may be arranged over the board substrate 40 prior to being arranged within the press machine. After the decorative paper sheet 44 is arranged over the board substrate 40, the carriage may be moved out of the press machine. Next, an alignment system substantially aligns the decorative paper sheet 44/board substrate 40 system with the embossing pattern in the upper press plate 56. In one aspect of the present invention, the alignment system may use the board edges to substantially align the decorative motif 44 with the embossing pattern on the upper press plate 56. The press machine may be operated after the alignment is complete.

In one aspect of the present invention, after the components illustrated in FIG. 5 are arranged within the press machine and aligned with the embossing pattern, the various sheets and substrate may be pressed and cured for predetermined amount of time until the resins set, yielding an extremely hard and wear resistant flooring plank. For example, after being inserted into the press machine and aligned with the embossing pattern, the board substrate 40, decorative paper sheet 44, protective overlay sheet 46, and optional base sheet 48 may be heated at a temperature of about 160-220° C. and pressed together under a pressure of about 20-40 Kg/cm² for about 20 to 60 seconds. Accordingly, the top press 54 presses the embossing pattern of the upper press plate 56 into the decorative paper sheet 44 and board substrate 40 structure. The combination of the applied heat and pressure fuses the decorative paper sheet 44 and the board substrate 40 together. The alignment system ensures that the decorative paper sheet 44 is substantially aligned with the embossing pattern in the upper press plate 56. Accordingly, melamine resin within the various sheets may be cured and an embossed-in-registration plank may be produced.

In one aspect of the present invention, porosity within the fused piece may be minimized by slowly curing the resins (e.g., the melamine). Accordingly, as the operating temperature is reduced, the time during which the various sheets within the press machine are pressed is increased. In another aspect of the present invention, as the press plate 56 is heated to about 160-220° C. the embossing pattern included within the press plate may expand. Accordingly, the embossing pattern on the press plate 56 may be provided so as to compensate for the expansion of the pattern. Therefore, the dimensions of the embossing pattern are provided such that they substantially correspond to the design of the decorative motif when the resins within the components of FIG. 5 are cured.

According to the principles of the present invention, a mechanically embossed surface texture may be imparted to an individual flooring plank having a decorative motif. In one aspect of the present invention, the mechanically embossed surface texture may be provided in registration with the decorative motif. Accordingly, an embossed-in-registration flooring plank may be fabricated. In another aspect of the present invention, a plurality of embossed-in-registration flooring planks may be joined together to form an embossed-in-registration flooring system. In yet another aspect of the present invention, at least a portion of embossed-in-registration patterns of adjacent flooring planks may be substantially aligned with each other to form substantially contiguous embossed-in-registration patterns across adjacent flooring planks within the flooring system.

While the embossed-in-registration process described above is suitable for embossed surface textures that are less than about 0.2 mm deep, deeper surface textures may be problematic. Embossing patterns capable of imparting deep surface textures, for example, require relatively large press plate protrusions that tend to disturb the pressure homogeneity applied across the board surface. This pressure disturbance can cause distortions in the final product. In one aspect of the present invention, embossed surface textures may be formed greater than about 0.2 mm deep by hollowing out the board substrate 40 at locations where deep surface textures are desired. In one aspect of the present invention, the hollowing out process may be performed before, during, or after the perimeter of the board substrate 40 is milled as described above. In another aspect of the present invention, the board edges may be used to locate the boundaries of the hollowed out portions of the board substrate 40.

Figure 7:
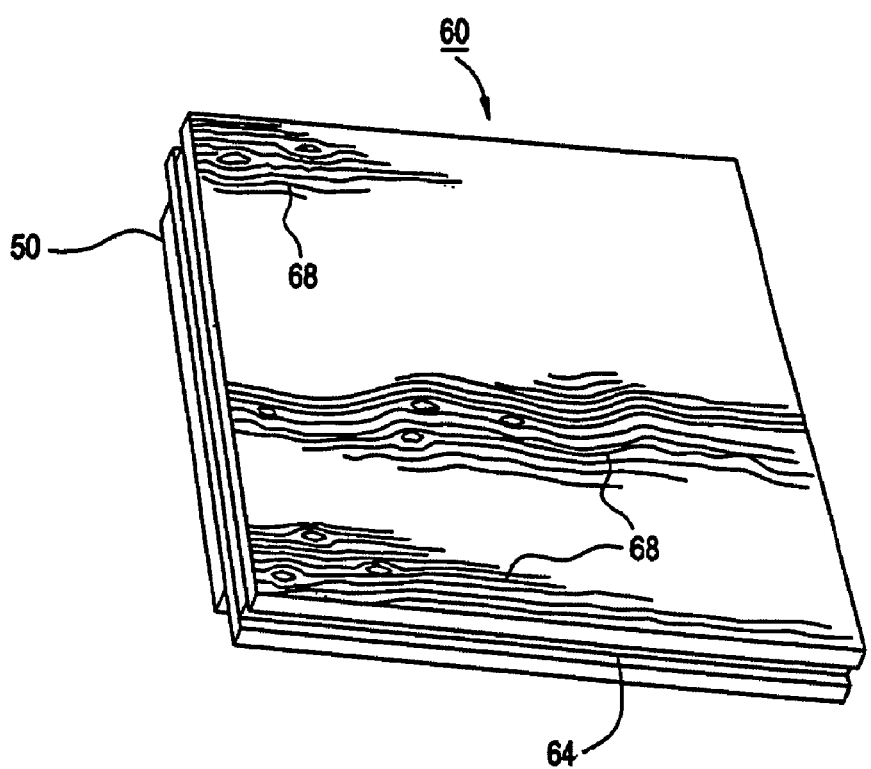
FIG. 7 illustrates an embossed-in-registration flooring plank in one aspect of the present invention.

Referring to FIG. 7, an embossed-in-registration flooring plank 60, fabricated according to the process described above may optionally include a protective padding layer 50 on one side. The mechanically embossed surface texture is registered with the decorative motif 68 of the decorative paper sheet 44. By registration, it is meant that the embossed surface texture is substantially aligned with the decorative motif of the decorative paper sheet 44. By providing an embossed-in-registration flooring plank, a realistic representation of a natural material may provided to individual flooring planks. While the decorative motif illustrated in FIG. 7 realistically represents the image and texture of a wood grain, it should be appreciated that other embossed-in-registration designs such as ceramic planks, concrete, marble, etc., may be produced.

According to the principles of the present invention, each of the individual flooring planks may, for example, include at least one locking mechanism.

In one aspect of the present invention, locking mechanisms may be incorporated within the board substrate 40 before the embossing pattern is imparted to the surface of the board substrate 40 in registration with the decorative motif. Accordingly, locking mechanisms may be fabricated within individual board substrates 40. Next, the locking mechanisms may be used to join individual board substrates together to form a plank structure. The plank structure may then be inserted into the press 54. After the embossing pattern is imparted to the plank structure and the fused components are fused together, the plank structure is removed from the press 54. Next, embossed-in-registration flooring planks 60 within the fused plank structure are separated by unlocking the locking mechanisms. In one aspect of the present invention, cutting tools may be used to assist in the separation and to ensure the decorative motif is not damaged.

In another aspect of the present invention, the locking mechanisms may be incorporated within the board substrate 40 after the embossing pattern is imparted to the surface of the board substrate 40 in registration with the decorative motif. Accordingly, a board substrate 40 having relatively large dimensions of, for example, 4'×8', may be embossed by the press 54. Next, the resulting embossed-in-registration substrate may be cut into a plurality of individual embossed-in-registration flooring planks 60. In one aspect of the present invention, edges of the individual embossed-in-registration flooring planks 60 may have smooth edges and precise dimensions. In one aspect of the present invention, the cutting may be performed using shaping tools, milling tools, cutting tools, breaking tools, etc. In one aspect of the present invention, the board substrate may be cut by the press machine. Accordingly, the board substrate 40 may be cut into units (e.g., strips) having dimensions of, for example, 300×300 mm, 400×400 mm, 600×600 mm, 1,200×300 mm, 1,200×400 mm, etc. Next, the locking mechanisms may be incorporated within the individual embossed-in-registration flooring planks 60. In one aspect of the present invention, the locking mechanisms may be hidden beneath the surface of the flooring planks or they may be visible.

According to the principles of the present invention, the locking mechanisms may be incorporated within the individual embossed-in-registration flooring planks 60 by aligning the at least one of the board edges, alignment marks, decorative motifs, and surface textures of the flooring plank with a milling tool. By aligning the milling tool with any of the aforementioned alignable features, locking mechanisms may be milled into the sides of the board substrates 40 such that, when flooring planks 60 are joined together the at least a portion of the decorative motifs form a continuous pattern and at least a portion of the embossed-in-registration patterns form a substantially continuous surface texture across adjacent flooring planks.

Figure 8:
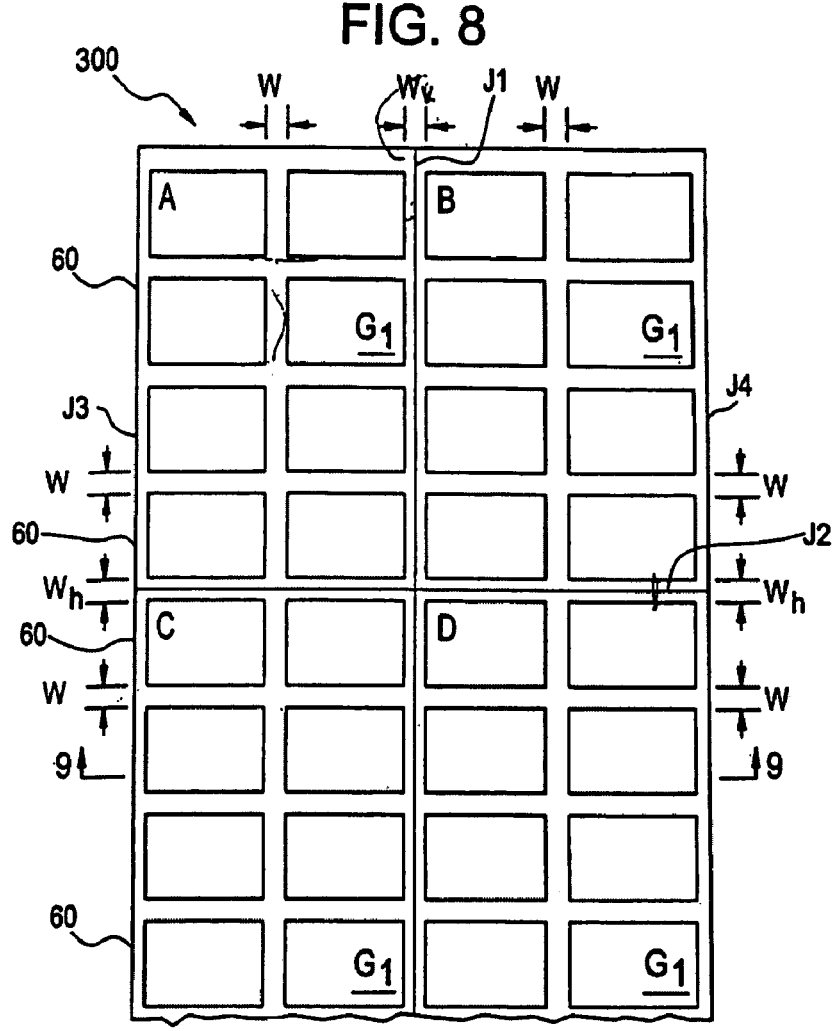
FIG. 8 illustrates a top view of a system of embossed-in-registration flooring planks in another aspect of the present invention.

According to the principles of the present invention, the embossed-in-registration flooring plank 60 may include a locking mechanism 64 (e.g., at least one of a tongue and groove locking system, a snap-together locking system, etc.) extending along all four sides of the embossed-in-registration laminate 60. For example, a snap-together locking system may be added to all four sides of the embossed-in-registration flooring plank 60 and used to connect multiple embossed-in-registration flooring planks 60 into an embossed-in-registration flooring system 300 (as shown in FIG. 8). The number and location of locking mechanisms may depend on the desired configuration of the embossed-in-registration flooring system. For example, when an embossed-in-registration flooring system abuts a corner, only two locking mechanisms are required (along the sides).

Referring to FIG. 8, the embossed-in-registration flooring planks A and B may, for example, include locking mechanisms along four sides (e.g., along joints J1, J2, J3, and J4). Embossed-in-registration flooring planks C and D may, for example, include locking mechanisms along four sides (e.g., along joints J1, J2, J3, and another joint not shown).

Embossed-in-registration flooring planks including the aforementioned locking mechanisms may be securely attached together with or without glue to form an embossed-in-registration laminate system 300. Multiple embossed-in-registration flooring planks may be joined together to obtain any desired shape for flooring, planking, or the like. The embossed-in-registration flooring planks may be joined to each other such that at least portions of embossed-in-registration patterns of adjacent flooring planks are substantially aligned with each other and form a substantially continuous image and embossed surface texture across flooring planks within a flooring system.

Figure 9:
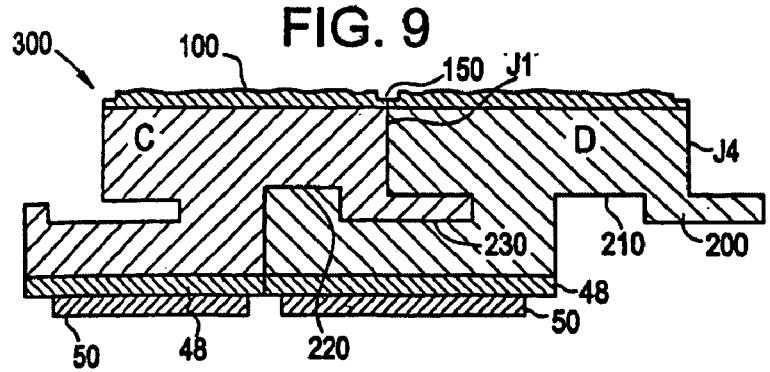
FIG. 9 illustrates a cross-sectional view along line 9-9 shown in FIG. 8.

FIGS. 8 and 9 illustrate an exemplary embossed-in-registration flooring system 300 incorporating one type of locking mechanism on each of the individual embossed-in-registration flooring planks 60. FIG. 9 illustrates an exemplary embossed-in-registration flooring system including flooring planks incorporating a snap-type tongue and groove locking mechanism. In one aspect of the present invention, the snap-type tongue and groove locking mechanism may be integrated into the sidewalls of each embossed-in-registration laminate 60 so as to ensure that embossed-in-registration patterns of adjacent flooring planks are substantially aligned with each other and substantially continuous within the flooring system.

FIG. 9 illustrates a cross sectional view of FIG. 8 taken along line 9-9. As shown, the locking mechanism may be fabricated by forming a groove 230, a tongue 200, a channel 210, and a lip 220 along the edges of the embossed-in-registration flooring planks 60. The locking mechanisms on the embossed-in-registration flooring planks 60 may be joined together by inserting the tongue 200 into the groove 230 of an adjacent embossed-in-registration flooring plank 60. Subsequently, the lip 220 is secured within channel 210, thereby joining adjacent embossed-in-registration flooring planks 60 into an embossed-in-registration flooring system 300. In one aspect of the present invention, the embossed-in-registration flooring planks 60 labeled A, B, C and D may be joined together with or without glue. It should is appreciated that other types of locking mechanisms may be incorporated within the sides of the individual embossed-in-registration flooring planks 60.

Referring back to FIG. 8, each of the embossed-in-registration flooring planks 60 may, for example, exhibit an embossed-in-registration ceramic plank motif G1. The ceramic plank motif may comprise a plurality of planks in the shape of squares, rectangles, triangles, circles, ovals, any other shape or design that are separated by grout lines. In one aspect of the present invention, widths of grout lines Wh, Wv, and the intraboard grout width W may be substantially equal. When incorporating the snap-type tongue and groove locking mechanism into the embossed-in-registration flooring planks 60 the grout width adjacent the joints J1, J2, J3, and J4 on each embossed-in-registration laminate A, B, C, and D are approximately one-half the intraboard grout width W. For example, the vertical plank grout width (Wv) across joint J1 is made up of grout lines on embossed-in-registration laminates A, B, C and D, such that when the embossed-in-registration laminates A, B, C, and D are joined at J1 the vertical grout width (Wv) is approximately equal to (W). Accordingly, the grout width on any individual embossed-in-registration flooring plank 60 adjacent a joint is one-half of intraboard grout width (W). In another aspect of the present invention, the horizontal and vertical grout widths Wh and Wv may be controlled such they are substantially equal to the dimensions of the intraboard grout width W. It should be appreciated, however, that the dimensions of the grout widths in the embossed-in-registration flooring planks depend on the type of locking mechanism incorporated and the decorative motif exhibited.

Figure 10:
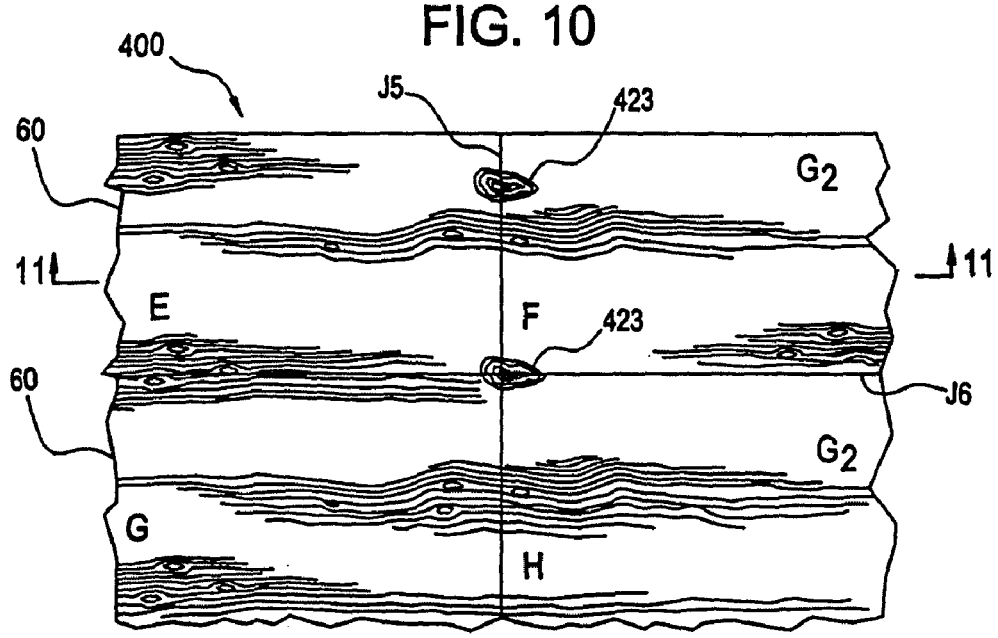
FIG. 10 illustrates a top view of a system of embossed-in-registration flooring planks in yet another aspect of the present invention.
Figure 11:
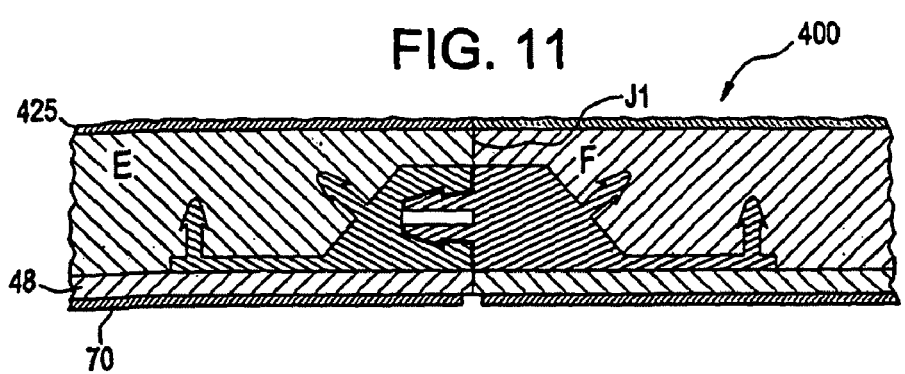
FIG. 11 illustrates a cross-sectional view along line 11-11 shown in FIG. 10.

In addition to grout lines, many other decorative motifs may be used in the embossed-in-registration flooring system of the present invention. Referring to FIGS. 10 and 11, a decorative motif exhibiting, for example, a wood grain surface G2 substantially aligned across joints J5 and J6 of adjacent flooring planks may be provided. According to the principles of the present invention, wood grain patterns generally include more elements (e.g., wood grain lines, wood knot 423, etc.) that extend to the perimeters of the flooring planks that need to be aligned than ceramic plank motifs. Accordingly, aligning the wood grain motif is generally more difficult than aligning grout line portions of the ceramic plank motifs. For example, aligning a first portion of a wood knot 423 on embossed-in-registration flooring plank E with a second portion of the wood knot 423 on embossed-in-registration flooring plank F is generally more complex than aligning grout line widths across joints of adjacent flooring planks. Accordingly, when fabricating a locking mechanism, consideration of all the graphic elements (e.g., wood grains lines and wood knots 423) must be considered to ensure a realistic embossed-in-registration flooring system 400. In one aspect of the present invention, at least one portion of the decorative motif may be used as an alignment marks ensuring consistent alignment of adjacent flooring planks.

In another aspect of the present invention, individual flooring planks within the embossed-in-registration flooring system 400 may be joined together with a snap-type mechanical system as illustrated in FIG. 11 depicting a cross sectional view of FIG. 10 along line 11-11. Again, alignment techniques used in the fabrication of the locking mechanism such that the embossed-in-registration laminate system 400 has a surface texture surface 423 that is substantially continuous across joints, J5 and J6. Optionally, the embossed-in-registration laminates 60 have a protective padding layer 70 under the base sheet 48.

Figure 12A:
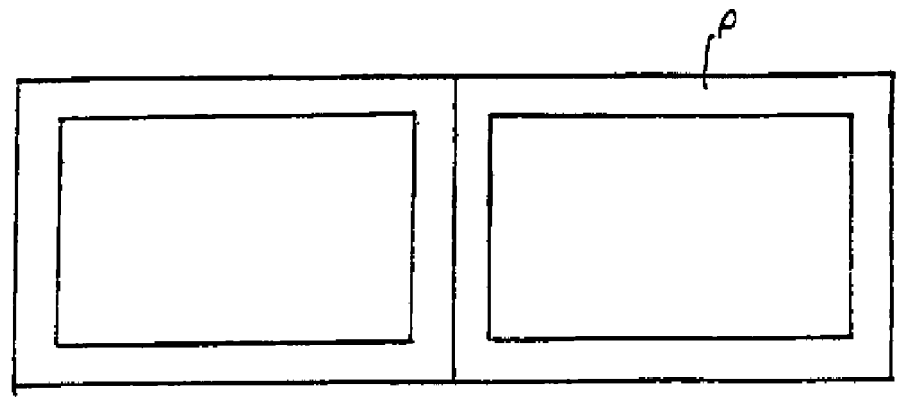
FIGS. 12A and 12B illustrate schematic views including a perimeter surface portion of a flooring plank in accordance with the principles of the present invention.
Figure 12B:
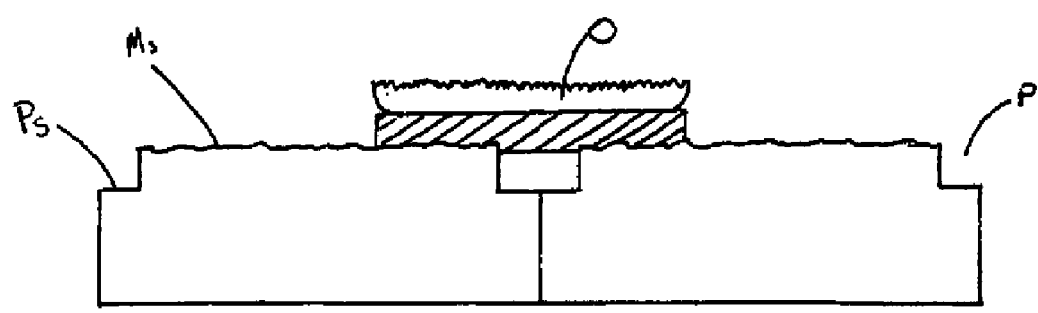

FIGS. 12A and 12B illustrate schematic views of a flooring plank in accordance with the principles of the present invention.

Referring to FIGS. 12A and 12B, an upper surface at the perimeter, P, of each embossed-in-registration flooring plank may be recessed below an upper surface at the portions of the flooring plank surrounded by the perimeter. An object O (e.g., a users shoe, a wheel, etc.) contacting the major surface, Ms, of a flooring plank does not generally contact the surface of the perimeter, Ps, due to the perimeter's recessed surface. In one aspect of the present invention, the perimeter may include a portion of the flooring plank extending from the edge of the flooring plank approximately 3.175 mm toward the center of the flooring plank. In another aspect of the present invention, the depth to which the surface of the perimeter of the flooring plank is recessed is approximately 0.794 mm. In another aspect of the present invention, the surface of at least one portion of the perimeter of a flooring plank may not be recessed, as will be discussed in greater detail below with reference to FIG. 13.

Accordingly, the embossed-in-registration pattern may be provided to the edges of the flooring plank and may be aligned with embossed-in-registration patterns formed on adjacent flooring planks while the edges of each individual flooring plank may be prevented from prematurely wearing.

Although it has been shown in FIGS. 8 and 10 that individual flooring planks within a flooring system are substantially the same size and shape and are joined to each other such that each side of each flooring plank is joined to only one adjacent flooring plank, it should be appreciated that individual flooring planks within a flooring system may vary in size (e.g., width and/or length) and shape (e.g., rectangular, square, triangular, hexagonal, etc.). In one aspect of the present invention, individual flooring planks may have complementary shapes capable of being assembled similar to a puzzle or mosaic. Further, one aspect of the present invention contemplates that sides of individual flooring planks may contact more than one adjacent flooring plank.

In accordance with the principles of the present invention, flooring planks within a flooring system may be arranged such that at least one side of each plank includes at least one sub-panel adjacent at least two other sub-panels. In another aspect of the present invention, each plank may include, either entirely or partially, at least one sub-panel, as will be described in greater detail below.

Figure 13A:
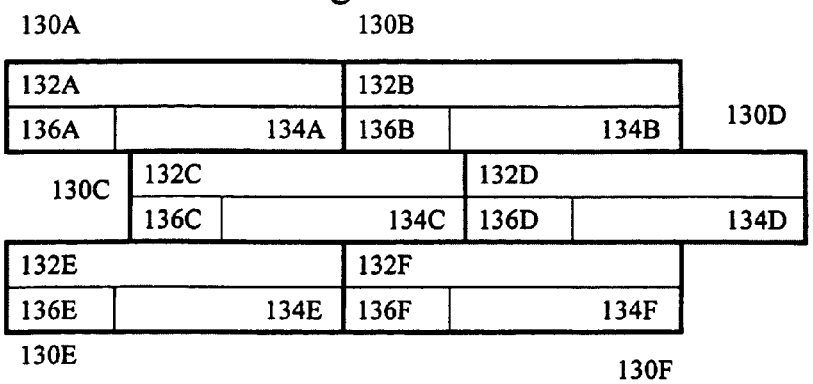
FIGS. 13A and 13B illustrate a flooring system in still another aspect of the present invention.

In FIG. 13A, for example, partial sub-panel 134A of plank 130A may be a complementary sub-panel with respect to neighboring partial sub-panel 136B of plank 130B, adjacent plank 130A. With this arrangement, the partial sub-panels 134A and 136B may be made to appear as one unitary sub-panel.

Still referring to FIG. 13A, each of the planks 130A-F may comprise at least three sub-panels wherein at least one of the sub-panels is a unitary sub-panel and at least two of the sub-panels are partial sub-panels. For example, 132A is a unitary sub-panel and 134A and 136A are partial sub-panels.

In one aspect of the present invention, the unitary sub-panel 132A may provide a complete decorative motif with or without an embossed surface texture that may or may not be in registration with the decorative motif. In another aspect of the present invention, the partial sub-panels 134A and 136A of a plank may provide separated, incomplete decorative motifs with or without embossed surface textures that may or may not be in registration with the decorative motifs. In one aspect of the present invention, neighboring partial sub-panels of adjacent planks may be complementary to each other such that they provide a substantially complete decorative motif and/or surface texture and appear as a substantially continuous, unitary sub-panel. In one aspect of the present invention, complementary partial sub-panels may have complementary decorative motifs and/or embossed surface textures. Accordingly, when complementary partial sub-panels of adjacent planks are properly aligned, a substantially continuous (i.e., complete) decorative motif and/or embossed surface texture may be formed across neighboring complementary partial sub-panels. In one aspect of the present invention, sub-panels within a plank may or may not comprise substantially the same decorative motif and/or embossed surface texture.

Figure 13B:
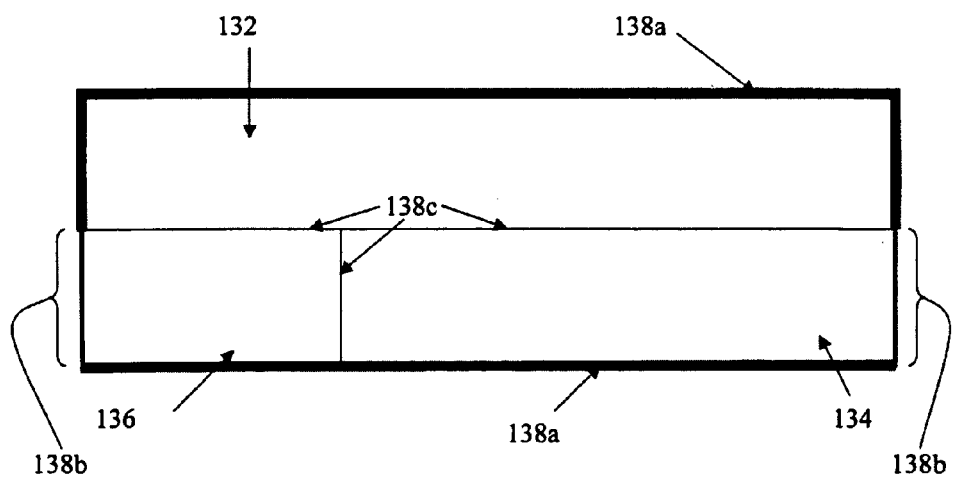

FIG. 13B illustrates a schematic view of an exemplary plank 130 such as that shown in FIG. 13A.

In one aspect of the present invention, portions of the perimeter surface of each plank may be recessed at locations where neighboring sub-panels are not complementary. In another aspect of the present invention, portions of the perimeter surface of each plank may be non-recessed at locations where neighboring sub-panels are complementary. Referring to FIG. 13B, portions of the upper surface of the perimeter "P" of each of the planks 130 indicated by reference numeral 138a may be slightly recessed compared to the major surface of each of the planks (see also FIG. 12B) to prevent premature wear of each of the planks. Further, portions of the upper surface of the perimeter of each of the planks 130 indicated by reference numeral 138b may be non-recessed and substantially coplanar with the major surface of the sub-panels. Recessing only portions of the perimeter surface of each of the planks at positions not occupied by the decorative motifs and/or embossed surface textures of partial sub-panels of a plank allows complementary partial sub-panels to appear as a part of a unitary sub-panel while not significantly detracting from the overall durability of each of the planks. In yet another aspect of the present invention, portions of the surface of each plank may be recessed at locations where sub-panels of a plank are adjacent one another. Referring to FIG. 13B, portions of the upper surface of each of the planks 130 indicated by reference numeral 138c may be slightly recessed compared to the major surface of each of the planks (see also FIG. 12B) to provide a visual and textural effect that each of the sub-panels of the plank are not a part of the same plank.

Figure 14A:
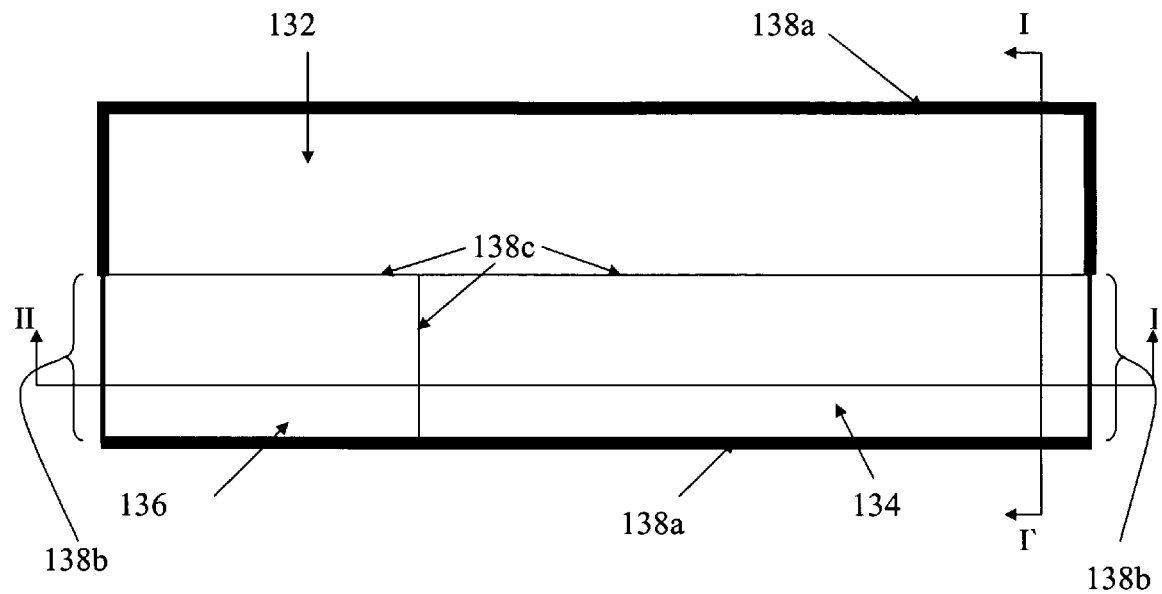
Figure 14B:
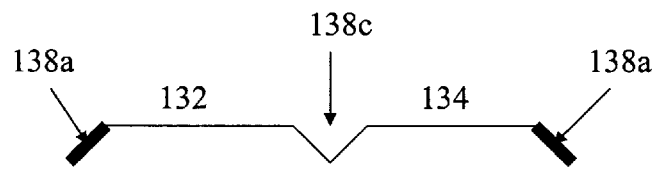
Figure 14C:
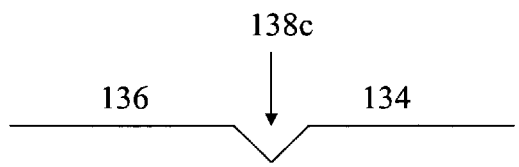

FIGS. 14A-14C illustrate an exemplary plank of a flooring system in still another aspect of the present invention.

Referring to FIGS. 14A-14C, similar to the plank shown in FIGS. 13A and 13B, portions of the upper surface of the perimeter "P" of each of the planks 130 indicated by reference numeral 138a may be beveled to prevent premature wear of each of the planks. Further, portions upper surface of the perimeter of each of the planks 130 indicated by reference numeral 138b may not be beveled such that they are substantially coplanar with the major surface of the sub-panels. Beveling the perimeter surface of each of the planks at positions corresponding to the decorative motifs and/or embossed surface textures of partial sub-panels of a plank allows complementary partial sub-panels to appear as a part of a unitary sub-panel while not significantly detracting from the overall durability of each of the planks. In yet another aspect of the present invention, portions of the surface of each plank may be provided with a groove at locations where sub-panels of a plank are adjacent to one another.

FIGS. 14B and 14C illustrate cross-sectional views of plank 130 taken across lines I-I' and II-II', respectively. Referring to FIGS. 14B and 14C, portions of the upper surface of each of the planks 130 indicated by reference numeral 138c may be beveled to form a groove. This groove may also prevent premature wear of each of the planks. Thus, the groove provides a visual and textural effect that sub-panels of a plank are separate. In one aspect of the present invention, the bevel at 138*c* may produce a groove having a substantially V-shaped groove. It is appreciated, however, that the bevel may produce other groove topographies (e.g., U-shaped grooves, etc.). In one aspect of the present invention, the beveling of each of the planks 130 at perimeter surface portion 138*a* creates a groove between adjacent planks. Accordingly, the groove formed between adjacent ones of the planks, via beveling at 138*a*, has substantially the same width and topography as grooves formed within the planks, via beveling at 138*c*.

The motif and/or surface texture present at the recessed surface of the perimeter of each plank may or may not correspond to the motif/surface texture present at the main surface of a corresponding plank. Thus, a substantially continuous motif and/or surface texture may or may not be present across the surfaces of the perimeter and the interior of any individual plank. Alignment marks or markings (not shown) can be used to self-align a decorative motif on the planks. In one aspect of the present invention, the embossed in-registration pattern may be a free form or custom design. It is to be understood that substantially any embossed-in-registration pattern and any decorative motif may be realized by applying the principles of the present invention. In one aspect of the present invention, alignment of the planks may be done visually upon joining them together. Accordingly, alignment of the planks 130 may be performed using the decorative motif and/or embossed surface texture of each of the planks.

While it has been illustrated that the planks in FIGS. 13A, 13B, and 14A-14C are substantially rectangular, the principles of the present invention allow the planks within the flooring system to have other shapes and sizes (e.g., geometric, freeform, etc.) or different or similar dimensions such that the flooring planks may be assembled in a "mosaic"-type arrangement or other regular, semi-repetitious, or random arrangement of panels. Further, while it is illustrated that each plank comprises an identical sub-panel layout, the principles of the present invention allow the planks within the flooring system to have other sub-panel layouts (e.g., other sub-panel shapes, sizes, etc.) The individual planks within the flooring system may be cut from a board such that joints between the flooring panels of the flooring system are not visible. Further, the planks within the flooring system illustrated in FIGS. 13 and 14 may be joined together with or without glue. Still further, while it has been discussed that the embossed surface texture is substantially aligned with an underlying decorative motif, it is to be understood that substantially any embossed surface texture may be imparted to the planks of the present invention, regardless of the underlying decorative motif. Still further, the decorative motifs and/or the embossed surface texture of one plank may not be aligned or even be remotely similar in appearance and/or texture to decorative motifs and/or embossed surface textures of adjacent planks.

According to the principles of the present invention, any of the aforementioned decorative motifs and/or embossed surface textures that may or may not be embossed in registration with the decorative motifs (collectively referred to herein as "patterns") may be applied to any of the aforementioned planks to form a substantially continuous pattern across adjacent planks arranged along a predetermined direction by forming each of the plank patterns using at least one bulk pattern and at least one edge pattern.

In one aspect of the present invention, each edge pattern may be present at a perimeter portion of the plank extending along at least a portion of at least one edge of each plank. In another aspect of the present invention, each edge pattern may extend to a predetermined distance (e.g., about one millimeter, about one inch, etc.) into the interior of the plank, away from the perimeter of the plank. In another aspect of the present invention, at least one bulk pattern may be arranged adjacent at least one edge pattern, wherein a pattern present at the edge of the bulk pattern adjacent the edge pattern may form a substantially continuous visual/textural pattern with a pattern present at the edge of the edge pattern adjacent the bulk pattern.

In one aspect of the present invention, patterns of individual planks, arranged adjacent each other along a predetermined direction within a flooring system, may complement patterns of adjacent planks (i.e., form substantially continuous patterns across adjacent planks) when edge patterns of the adjacent planks form a substantially continuous pattern. Where the flooring system described above comprises a plurality of adjacent planks arranged along the predetermined direction, and where the edges of each plank are arranged adjacent to edge patterns of other planks along the predetermined direction, edge patterns of adjacent planks are identical or substantially identical. The identical or substantially identical edge patterns of adjacent planks enable a continuous pattern to be formed across the adjacent planks.

Figure 15A:
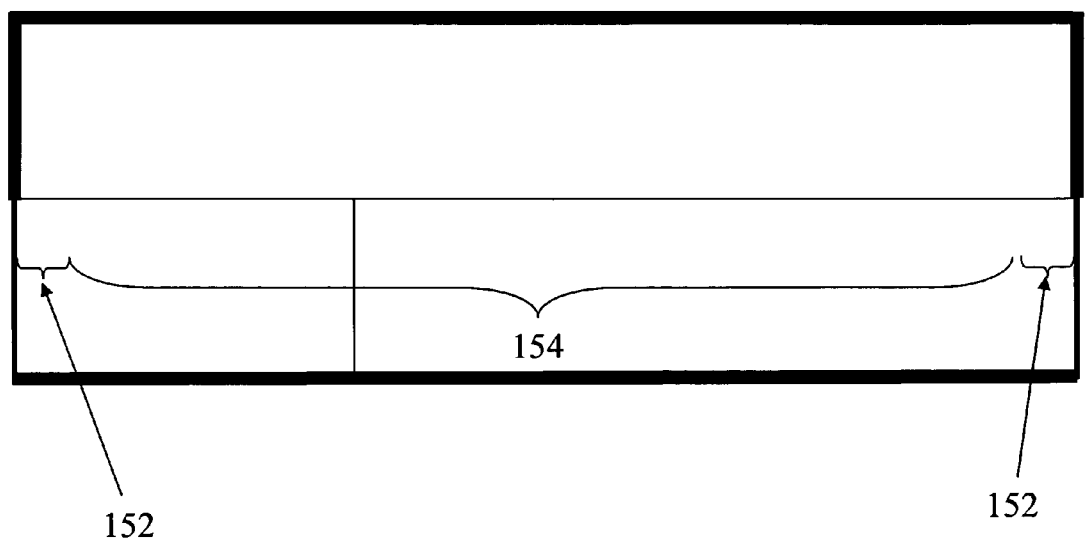

For example, referring to FIG. 15A, an exemplary plank pattern of plank 150 may comprise two edge patterns 152 substantially identical to each other and a bulk pattern 154. As shown in FIG. 15A, the two substantially identical edge patterns 152 are present at a perimeter portion of the plank 150, extend along a portion of the opposite edges of the plank, and extend a predetermined distance into the interior of the plank 150. Still referring to FIG. 15A, the pattern present at the edge of the bulk pattern 154 adjacent the edge patterns 152 forms a substantially continuous pattern with the pattern present at the edge patterns 152 adjacent the bulk pattern.

Figure 15B:
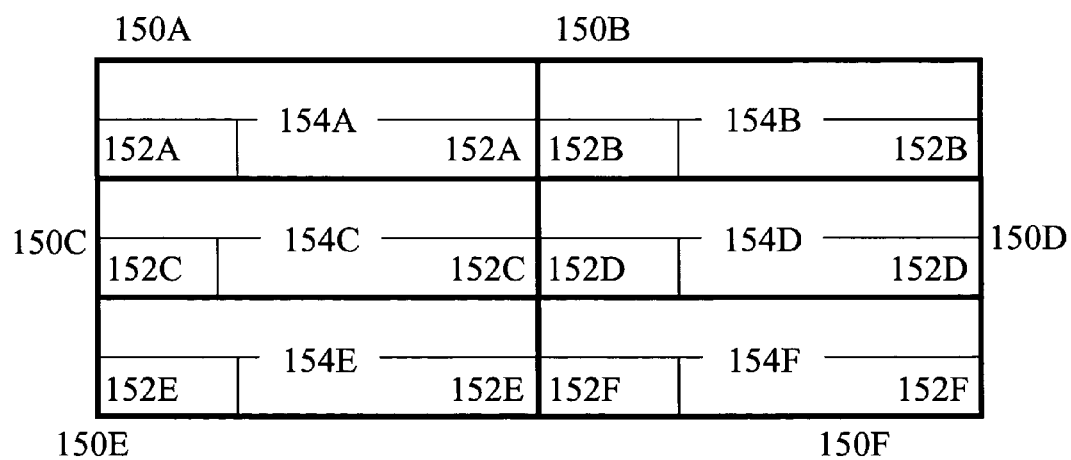

Referring now to FIG. 15B, a plurality of planks 150A, 150B, 150C, etc., such as those illustrated in FIG. 15A may be arranged adjacent each other within a flooring system along a predetermined direction such that edges of each plank are arranged adjacent to the edges of other planks along the predetermined direction (e.g., an edge of plank 150A is adjacent an edge of plank 150B, an edge of plank 150C is adjacent an edge of plank 150D, etc.). As mentioned above, a substantially continuous pattern may be formed across an individual plank 150 because the bulk pattern 154 is substantially aligned with the edge patterns 152.

In an embodiment of the invention, the predetermined direction in which the planks are arranged is based on the adjacent edge patterns 152 in the planks, such that only by arranging the planks in the predetermined direction will the pattern formed be continuous and natural-looking. In this embodiment, reversing a plank or flipping a plank over will result in a discontinuous pattern. However, it is understood that in another embodiment, the edge patterns along a portion of the perimeter may be selected such that reversing, flipping or otherwise rearranging planks does not disrupt the pattern, i.e. the pattern is continuous.

In another embodiment, the predetermined direction is based on the interlocking mechanism that joins adjacent planks, such that the planks will not fit together properly if they are arranged in a direction other than the predetermined direction. One example of such a interlocking mechanism is a glueless tongue and groove system, in which the tongue is formed along at least one edge of the plank and the groove formed along the opposite edge. In yet another embodiment, the predetermined direction is based on both the edge patterns 152 and the glueless locking mechanism.

According to the principles of the present invention, bulk patterns 154A-154F may or may not be the same. In one aspect of the present invention, each of the bulk patterns 154 within a flooring system may be unique. Further, according to the principles of the present invention, edge patterns of individual planks may be substantially identical. Therefore, edge patterns of adjacent planks in a flooring system, across which a substantially continuous pattern is formed along the predetermined direction, are also substantially identical. A substantially continuous pattern may be provided across plank 150A because bulk pattern 154A and edge patterns 152A are aligned with each other to produce a substantially continuous pattern. Substantially continuous patterns may be individually provided across planks 150B, 150C, etc., because their respective bulk patterns 154B, 154C, etc., and edge patterns 152B, 152C, etc. are similarly aligned with each other to produce a substantially continuous pattern.

Because the edge patterns of planks 150A-150F within the flooring system illustrated in FIG. 15B are identical, edge pattern 152A forms a substantially continuous pattern with edge pattern 152B, edge pattern 152C forms a substantially continuous pattern with edge pattern 152D, and so on. Accordingly, a substantially continuous pattern may be formed across planks 150A and 150B, across planks 150C and 150D, and so on. The boundary or joint between the edge pattern 152A and the edge pattern 152B is substantially not visible, or the appearance of the presence of the boundary or joint is minimized. Similarly, the boundary or joint between the edge pattern 152C and the edge pattern 152D is substantially not visible, or the appearance of the presence of the boundary or joint is minimized. The boundary or joint between the edge pattern 152E and the edge pattern 152F is substantially not visible, or the appearance of the presence of the boundary or joint is minimized.

In one embodiment of the present invention, in which the edge patterns 152 are all substantially identical, any of the planks 150A-150F may replace any other plank within the flooring system while still maintaining the presence of a substantially continuous pattern across planks arranged adjacent each other along the predetermined direction. This is because all bulk patterns of a plank are substantially aligned with their respective edge patterns to form substantially continuous patterns within a plank and because all edge patterns of planks adjacent each other within a flooring system are identical, forming form substantially continuous patterns across planks adjacent each other along the predetermined direction.

In another embodiment, planks may have adjacent right and left edge patterns 152 substantially identical, while opposite left and right edge patterns 152 are not.

Figure 15C:
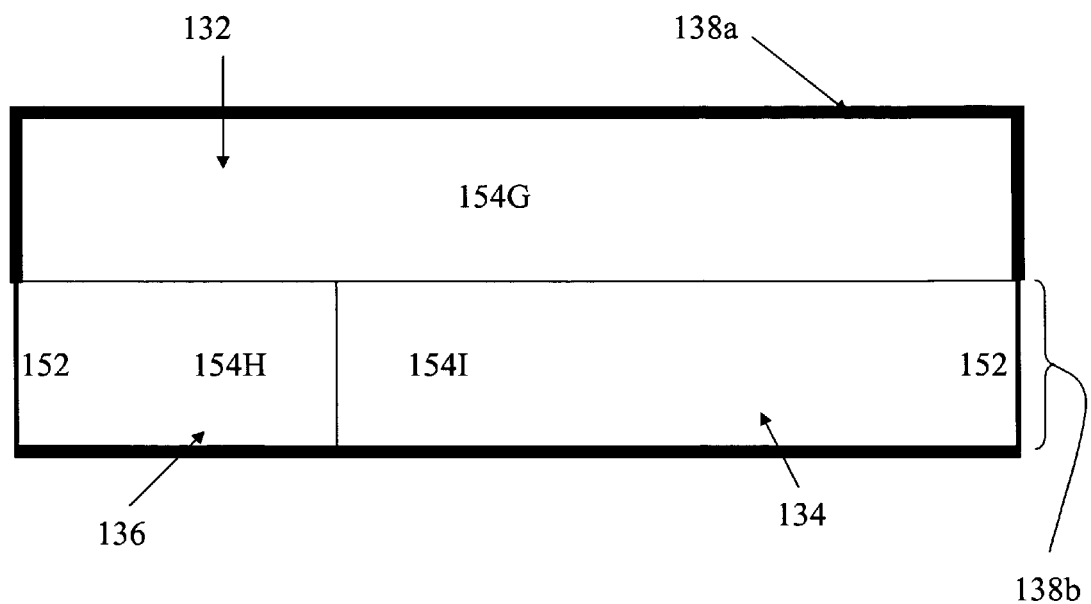

For example, in FIG. 15C, the unitary sub-panel 132 of plank 150 may have a pattern provided by a bulk pattern 154G, partial sub-panel 134 may have a pattern provided by bulk pattern 154I and edge pattern 152, and partial sub-panel 136 may have a pattern provided by bulk pattern 154H and edge pattern 152, wherein the bulk patterns 154G-154I may or may not be the same. As mentioned above, however, the edge pattern 152, present at the perimeter of the partial sub-panel portions 134 and 136 of the plank 150 and extending along a portion of the edges of the plank 150, are identical to each other. Accordingly, in view of FIG. 13A, when, for example, planks 130A and 130B are arranged adjacent each other along a predetermined direction, edge patterns 152 of complementary partial sub-panels 134A and 136B are substantially identical to each other and a substantially continuous pattern may be formed across adjacent planks, wherein the bulk patterns of the complementary partial-sub panels become a part of a substantially continuous pattern, appearing, visually and/or texturally as a unitary sub-panel.

Figure 15D:
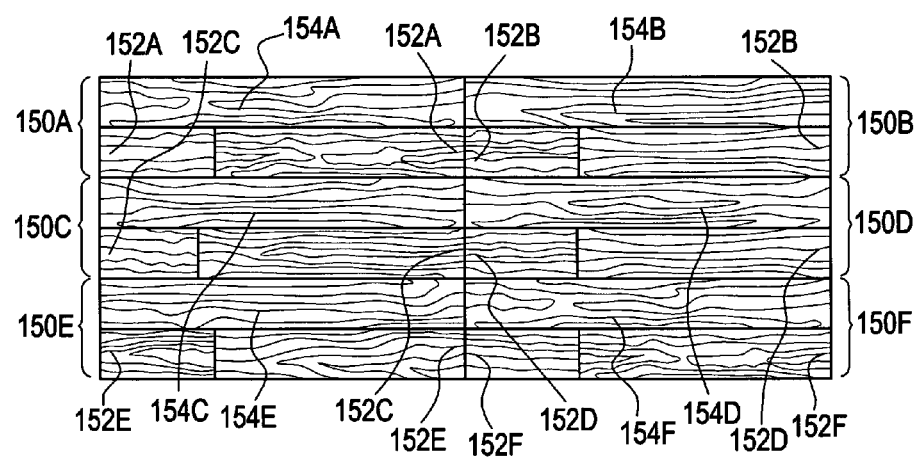

Furthermore, referring now to FIGS. 15C and 15D, flooring systems incorporating planks such as those illustrated in FIGS. 13A-14C may be provided with substantially continuous patterns across planks adjacent each other along predetermined directions by applying the techniques described above with reference to FIGS. 15A and 15B. FIG. 15D shows the planks having a woodgrain pattern in the arrangement shown in FIG. 15B. Because the edge pattern 152A is substantially identical to the adjacent edge pattern 152B, planks 150A and 150B have the appearance of a substantially continuous woodgrain pattern running uninterrupted across the boundary or joint between edge pattern 152A and edge pattern 152B of the adjacent plank.

In addition, because the edge patterns 152A and 152B do not run along the entire length of the boundary or joint between planks 150A and 150B, but only along the portion corresponding to the height of the partial board on the bottom half of the planks, the pattern is not continuous across that portion of the boundary between planks 150A and 150B corresponding to the height of the complete boards on the top half of the planks.

As mentioned above, within the flooring system incorporating the planks illustrated in FIGS. 13A-14C and 15C, the bulk patterns within the sub-panels of the planks may or may not be the same. In one aspect of the present invention, each of the bulk patterns within the flooring system may be unique.

FIG. 15E shows an embodiment of the invention in which the edge patterns of the planks are identical (or substantially identical) in every plank. Specifically, FIG. 15E shows four planks, 150A, 150B, 150C, and 150D arranged such that plank 150A is adjacent the left edge of plank 150B and adjacent to a top edge of plank 150C. Plank 150D is adjacent to the right edge of plank 150C and adjacent to the bottom edge of 150B.

In this embodiment, the decor paper of each plank has a wood design. However, it is understood that other natural looking designs other than wood are contemplated by this invention as well. The wood design in plank 150A includes, for example, a complete board or strip 155A on a top half of the board, a short incomplete board 151A and a long incomplete board 153A. Each of the boards has a woodgrain pattern. In addition, the short and long incomplete boards 151A and 153A have an edge pattern 152 running along a portion of the perimeter of the plank corresponding to the width of the incomplete boards 151A and 153A, and may extend a small distance (such as one centimeter, for example) into the interior of the boards. The edge patterns 152 of incomplete boards 151A and 153A are identical. The edge patterns 152 may also not extend into the interior of the boards.

Similarly, planks 150B, 150C, and 150D have complete boards 155B, 155C, and 155D, respectively, running the length of the plank, and short boards 151B, 151C, and 151D which are adjacent to long boards 153B, 153C, and 153D, respectively. Each of the short and long boards may have an identical edge pattern 152 along a portion of the perimeter of the plank corresponding to the width of the short and long boards.

All short boards 151A-D, long boards 153A-D, and complete boards 155A-D have woodgrain patterns that are different from each other or some identical to each other. Only the edge patterns 152 in the incomplete boards are identical in this particular example. Furthermore, the edge pattern and interior woodgrain pattern of each incomplete board form a continuous pattern. In other words, there is a continuous overall woodgrain pattern on each of the short boards and long boards that are all different from one another, despite the fact that the edge patterns 152 are the same.

When planks 150A and 150B are placed adjacent to one another as shown in FIG. 15E, complete boards 155A and 155B will be adjacent to each other, and long board 153A and short board 151B will be adjacent. Complete boards 155A and 155B appear as separate boards and the woodgrain pattern is discontinuous across them, because the adjacent edges of the complete boards are different. But because the edge patterns 152 in long board 153A and short board 151B are the same, the unique woodgrain patterns of 153A and 151B appear to form a single continuous board with a unique woodgrain pattern running across the planks 150A and 150B. Furthermore, the appearance of a complete and continuous board with a unique woodgrain pattern running in boards 153A and 151B across the planks minimizes the visibility or appearance of the joint or boundary between the planks. Similarly, the woodgrain pattern across boards 153C and 151D is continuous.

In a further embodiment, the planks 150A, 150B, 150C, and 150D may have a surface texture that is embossed in registration with the wood design on the décor paper. Because edge patterns 152 are part of that wood design and may be the same or substantially identical in every plank, the embossed surface texture will appear to be continuous along the incomplete boards of adjacent planks in the manner discussed above. In still another embodiment, the embossed in registration surface texture may include bevels to imitate seams between boards, such that in plank 150A, for example, the complete board 155A would have a bevel running along its perimeter, including the boundary between board 155A and incomplete boards 151A and 153A. The incomplete boards 151A and 153A would have a bevel where they are adjacent, but the incomplete boards would not have a bevel along the portion of the perimeter of the plank 150A where the edge patterns 152 are located. In this way, a continuous wood grain pattern and corresponding embossed in registration surface texture can run continuously across planks 150A and 150B uninterrupted by a bevel. This would further reduce the appearance of the boundary between planks.

By having all edge patterns 152 to be identical, the present invention allows any planks to be fit together in the predetermined direction in which a long board 153 is adjacent a short board 151 of another plank, because the edge patterns 152 will always line up to form the appearance of a continuous wood grain pattern running across the adjacent long and short boards of the two planks. For example, if the positions of planks 150A and 150B were reversed (such that plank 150B was adjacent a top edge of plank 150C), the edge pattern 152 of long board 153B would match or be aligned with the edge pattern of short board 151A, forming a continuous wood grain pattern in the boards 153B and 151A across planks 150B and 150A.

The present invention reduces the complexity involved in installing a laminated floor, because it does not matter which planks are placed adjacent to one another in the predetermined direction. The patterns will be aligned. In a further embodiment, the planks 150 are provided with a glueless interlocking tongue and groove system in which the tongue is formed on two adjacent perimeter edges of the plank and the groove is formed in the opposite two adjacent perimeter edges so that the planks can only be fit together in the direction that will align long boards 153 with short boards 151, for example, where edge patterns 152 meet.

Furthermore, because in this embodiment only the edge patterns are required to be identical, the interior patterns of the complete, long and short boards of the planks can be different, providing a more natural looking floor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flooring system, comprising:
a unitary flooring plank comprising:
a plurality of sides defining a perimeter having a recessed surface in predetermined locations;
a plurality of edge patterns, each edge pattern arranged proximate at least one first portion of the perimeter at a corresponding one of the sides, wherein at least two of the plurality of edge patterns are substantially identical; and
at least one bulk pattern arranged adjacent the plurality of edge patterns and proximate at least one second portion of the perimeter, wherein elements of at least one bulk pattern and elements of an edge pattern adjacent the at least one bulk pattern correspond in location and orientation to form a substantially continuous pattern across the bulk pattern and the edge pattern adjacent the at least one bulk pattern, wherein surfaces of the perimeter corresponding to the substantially continuous pattern are not recessed.

2. The plank according to claim 1, wherein at least one edge pattern comprises a decorative motif.

3. The plank according to claim 1, wherein at least one bulk pattern comprises a decorative motif.

4. The plank according to claim 1, wherein at least one edge pattern comprises an embossed surface texture.

5. The plank according to claim 1, wherein at least one bulk pattern comprises an embossed surface texture.

6. The plank according to claim 1, wherein at least one edge pattern comprises an embossed surface texture in registration with a decorative motif.

7. The plank according to claim 1, wherein at least one bulk pattern comprises an embossed surface texture in registration with a decorative motif.

8. The plank according to claim 1, wherein at least one edge pattern comprises an embossed surface texture out of registration with a decorative motif.

9. The plank according to claim 1, wherein at least one bulk pattern comprises an embossed surface texture out of registration with a decorative motif.

10. The plank according to claim 1, wherein the at least one first portion and the at least one second portion of the perimeter constitute the perimeter.

11. The plank according to claim 1, wherein the plurality of edge patterns are formed on the at least one first portion of the perimeter.

12. The plank according to claim 11, wherein at least one edge pattern extends away from the perimeter by a predetermined distance.

13. The plank according to claim 12, wherein the predetermined distance is about 1 centimeter from the perimeter of the plank.

14. The plank according to claim 1, wherein at least one edge pattern extends along at least a portion of at least one of the plurality of sides.

15. The plank according to claim 1, wherein the plurality of edge patterns extend along an entirety of at least one of the plurality of sides.

16. A flooring system, comprising:
   at least two unitary planks adjacent each other along a predetermined direction, wherein each plank comprises:
   a plurality of sides defining a perimeter having a recessed surface in predetermined locations;
   a plurality of edge patterns arranged proximate at least one first portion of the perimeter, wherein at least two of the plurality of edge patterns are substantially identical; and
   at least one bulk pattern arranged adjacent the plurality of edge patterns and proximate at least one second portion of the perimeter wherein elements of at least one bulk pattern and elements of an edge pattern adjacent the at one least bulk pattern correspond with each other in orientation and position to form a substantially continuous pattern,
   wherein elements of the edge patterns of two of the at least two planks correspond with each other in location and orientation to form a substantially continuous pattern crossing the two of the at least two planks, and wherein the bulk pattern in a first of the at least two planks and the bulk pattern in the second of the at least two planks are different, wherein surfaces of the perimeter corresponding to the substantially continuous pattern are not recessed.

17. A plank according to claim 16, wherein at least one edge pattern comprises a decorative motif.

18. A plank according to claim 16, wherein at least one bulk pattern comprises a decorative motif.

19. A plank according to claim 16, wherein at least one edge pattern comprises an embossed surface texture.

20. A plank according to claim 16, wherein at least one bulk pattern comprises an embossed surface texture.

21. A plank according to claim 16, wherein at least one edge pattern comprises an embossed surface texture in registration with a decorative motif.

22. A plank according to claim 16, wherein at least one bulk pattern comprises an embossed surface texture in registration with a decorative motif.

23. A plank according to claim 16, wherein at least one edge pattern comprises an embossed surface texture out of registration with a decorative motif.

24. A plank according to claim 16, wherein at least one bulk pattern comprises an embossed surface texture out of registration with a decorative motif.

25. A plank according to claim 16, wherein the at least one first portion and the at least one second portion of the perimeter constitute the perimeter.

26. A plank according to claim 16, wherein the plurality of edge patterns are formed on the at least one first portion of the perimeter.

27. A plank according to claim 26, wherein at least one edge pattern extends away from the perimeter by a predetermined distance.

28. A plank according to claim 27, wherein the predetermined distance is about 1 centimeter from the perimeter of the plank.

29. A plank according to claim 16, wherein at least one edge pattern extends along at least a portion of at least one of the plurality of sides.

30. A plank according to claim 16, wherein the plurality of edge patterns extend along an entirety of at least one of the plurality of sides.

31. The flooring system according to claim 16, further comprising a tongue extending from the perimeter of one edge of each plank and a groove running along the perimeter of the opposite edge of each plank, wherein any of said grooves is capable of receiving any of said tongues.

32. The flooring system according to claim 31, wherein only planks arranged in a direction such that the tongue of one planks fits into the groove of an adjacent plank fit together.

33. A laminate flooring system, comprising:
   a unitary flooring panel having a plurality of sides defining a perimeter;
   a surface of the unitary flooring panel having thereon a decorative motif embossed in registration with a surface texture having an upper level and a lower level, said decorative motif comprising at least two edge patterns adjacent each of the sides of the panel and at least one bulk pattern in the interior of the panel and adjacent the edge pattern on each side, said edge patterns and said bulk pattern being different,
   wherein at least one edge pattern along a side is substantially identical to the edge pattern in a corresponding position along an opposite side;
   wherein at least one portion of the decorative motif along a side is substantially different from a corresponding portion of the decorative motif along an opposite side, and
   wherein an upper level of at least a portion of the edge pattern is substantially coplanar with the bulk pattern such that the perimeter is not recessed and wherein a portion of the perimeter is recessed.

34. The plank according to claim 33, wherein the plurality of edge patterns comprise an embossed surface texture.

35. The plank according to claim 33, wherein the at least one bulk pattern comprises an embossed surface texture.

36. The plank according to claim 33, wherein the plurality of edge patterns comprise an embossed surface texture in registration with a decorative motif.

37. The plank according to claim 33, wherein the at least one bulk pattern comprises an embossed surface texture in registration with a decorative motif.

38. The plank according to claim 33, wherein the plurality of edge patterns comprise an embossed surface texture out of registration with a decorative motif.

39. The plank according to claim 33, wherein the at least one bulk pattern comprises an embossed surface texture out of registration with a decorative motif.

40. The plank according to claim 33, wherein the plurality of edge patterns extend away from the perimeter by a predetermined distance.

41. The plank according to claim 40, wherein the predetermined distance is about 1 centimeter from the perimeter of the plank.

42. The plank according to claim 33, further comprising a tongue extending from the perimeter of one edge of the plank and a groove running along the perimeter of the opposite edge of the plank, wherein said groove is capable of receiving said tongue.

43. The plank according to claim 33, wherein the tongue interconnects with a groove of an adjacent plank.

44. A laminate flooring system comprising:
   a first unitary flooring plank, the first unitary flooring plank having:
   a rectangular shape having first and second short sides and first and second long sides; and
   the rectangular shape having a first row and a second row of strips,
   wherein the first and second rows have the same length as each other and are aligned with each other such that a portion of the outer edges of the first and second rows cooperatively define a perimeter of the rectangular shape;
wherein the first row has a full unbroken strip; and
wherein the second row has at least two partial strips; and
wherein an edge pattern on an edge of the second row adjacent the first short side and an edge pattern along an edge of the second row adjacent the second short side are the same as each other and are continuous; and
wherein a perimeter of the edge patterns of the second row of the first unitary plank is not recessed.

45. The laminate flooring system of claim 44, further comprising:
a second unitary flooring plank having a rectangular shape
the rectangular shape of the second flooring plank having first and second short sides and first and second long sides; and
the rectangular shape having first and second rows of strips, wherein the first and second rows have the same length as each other;
wherein the first row has a full unbroken strip;
wherein the second row has at least two partial strips;
wherein an edge pattern on an edge of the second row adjacent the first short side and an edge pattern along an edge of the second row adjacent the second short side are the same as each other and are continuous; and
wherein the edge patterns of the second row of the first unitary plank are continuous with as the edge patterns of the second row of the second unitary plank; and
wherein a perimeter of the edge patterns of the second row of the second unitary plank is not recessed.

46. The laminate flooring system of claim 45, wherein the first unitary flooring plank connects with the second unitary flooring plank; and
wherein the full unbroken strip of the first flooring plank connects with the complete strip of the second flooring plank.

47. The laminate flooring system of claim 45, wherein the second row of the first unitary flooring plank has a first and second partial strip and the second row of the second unitary flooring plank has a first and second partial strip;
wherein the second partial strip of the first unitary flooring plank connects to the first partial strip of the second unitary flooring plank.

48. The laminate flooring system of claim 44, wherein the full unbroken strip, the first partial strip, and the second partial strip of the first unitary flooring plank are separated by bevels embossed into the surface of the first unitary flooring plank.

49. The laminate flooring system of claim 45, wherein the full unbroken strip, the first partial strip, and the second partial strip of the second unitary flooring plank are separated by bevels embossed into the surface of the second unitary flooring plank.

50. A laminate flooring system, comprising:
a plurality of unitary flooring panels including at least a first, second, and third unitary flooring planks, each of said unitary flooring planks having:
a rectangular shape having first and second short sides and first and second long sides, the rectangular shape having a first and second row of strips, wherein the first and second rows have the same length and are aligned with each other such that a portion of the outer edges of the first and second rows cooperatively define a perimeter of the rectangular shape;
the first row having a first strip, said first strip being an unbroken complete strip; and
the second row having a second partial strip and a third partial strip, the second and third partial strips having a continuous edge pattern along an edge of the short side;
a portion of the perimeter of each respective plank being recessed where patterns of adjacent planks are continuous and a portion of the perimeter of each respective plank where patterns of adjacent planks are discontinuous.

51. The laminate flooring system of claim 50, wherein a pattern of the first strip adjacent a short side of the rectangular shape is not continuous.

52. The laminate flooring system of claim 51, wherein the pattern of the first strip that is not continuous is a bevel.

53. The laminate flooring system of claim 50, wherein the third partial strip of the first unitary plank connects to the second partial strip of the second unitary plank.

54. The laminate flooring system of claim 50, wherein the third partial strip of the first unitary plank connects to the second partial strip of the third unitary plank.

55. The laminate flooring system of claim 50, wherein the third partial strip of the first unitary plank connects to the second partial strip of the second unitary plank and the second partial strip of the first unitary plank connects to the third partial strip of the third unitary plank.

56. The laminate flooring system of claim 55, wherein the second and third unitary planks can be interchanged and the edge patterns of the partial strips in the second row of adjacent unitary planks match.

57. The laminate flooring system of claim 50, wherein the combined length of the second and third partial strips is the same as the length of the first strip.

58. The laminate flooring system of claim 50, wherein all four sides of the first row are beveled.

59. The laminate flooring system of claim 50, wherein the second and third partial strips have a bevel between them; and
wherein a bevel is between the first strip and the second partial strip and the first strip and the third partial strip.

60. The laminate flooring system of claim 50, wherein the side of the second partial strip having the continuous edge pattern does not have a bevel and the side of the third partial strip having the continuous edge pattern does not have a bevel.

61. The laminate flooring system of claim 50, wherein the plurality of unitary flooring panels can be installed in any order to give the appearance of a random pattern of complete strips.

62. The laminate flooring system of claim 50, wherein each of said unitary flooring planks in said plurality includes an interlocking joint that only allows adjacent planks to be locked together such that first rows of planks are adjacent to other first rows in a direction parallel to the long sides of the rectangular shape of the unitary flooring planks.

* * * * *